(12) United States Patent
Yoshioka et al.

(10) Patent No.: US 7,546,211 B2
(45) Date of Patent: Jun. 9, 2009

(54) CONDITION DETECTION APPARATUS, CONDITION DETECTION METHOD, CONDITION DETECTION PROGRAM, INFORMATION RECORDING MEDIUM THEREFOR, AND CONDITION DISPLAY APPARATUS, CONDITION DISPLAY METHOD, CONDITION DISPLAY PROGRAM, INFORMATION RECORDING MEDIUM THEREFOR

(75) Inventors: Takeo Yoshioka, Nakakoma-gun (JP); Yoshiyuki Honjo, Nakakoma-gun (JP); Shigeo Watanabe, Nakakoma-gun (JP)

(73) Assignee: THK Co., Ltd., Tokyo (JP)

( * ) Notice: Subject to any disclaimer, the term of this patent is extended or adjusted under 35 U.S.C. 154(b) by 179 days.

(21) Appl. No.: 11/661,103

(22) PCT Filed: Aug. 30, 2005

(86) PCT No.: PCT/JP2005/015792
§ 371 (c)(1),
(2), (4) Date: Feb. 26, 2007

(87) PCT Pub. No.: WO2006/025404
PCT Pub. Date: Mar. 9, 2006

(65) Prior Publication Data
US 2008/0065354 A1    Mar. 13, 2008

(30) Foreign Application Priority Data
Aug. 31, 2004   (JP)  ............................ 2004-253389
Aug. 31, 2004   (JP)  ............................ 2004-253390

(51) Int. Cl.
*G06F 11/30*    (2006.01)

(52) U.S. Cl. ............................ 702/33; 702/34; 702/56; 702/183; 384/8; 73/587; 73/580

(58) Field of Classification Search ................. 702/33, 702/34, 56, 183; 384/8; 73/146, 146.2, 146.3, 73/146.5, 865.9, 269, 861.21, 580, 105, 587, 73/159; 156/398, 136, 460; 453/49, 33; 356/426; 521/64, 50; 701/37, 65; 324/558, 324/554, 701
See application file for complete search history.

(56) References Cited

U.S. PATENT DOCUMENTS 3,759,095 A *   9/1973   Short et al. ................... 73/157

(Continued)

FOREIGN PATENT DOCUMENTS

JP    55-138616 A    10/1980

(Continued)

OTHER PUBLICATIONS

International Search Report of PCT/JP2005/015792, date of mailing Dec. 20, 2005.

*Primary Examiner*—Carol S Tsai
(74) *Attorney, Agent, or Firm*—Westerman, Hattori, Daniels & Adrian, LLP.

(57) ABSTRACT

A condition detection apparatus comprising an AE sensor 1 that detects AE waves, which elastically-occur when a plurality of balls included in an LM system self-rotate and revolve within a circulation section at the same time, and generates detection signals Sae, and a signal processing unit 4 that generates a first parameter indicating an intensity of the AE waves based on the generated detection signals Sae, generates based on the detection signals Sae a second parameter by weighting only detection signals Sae temporally-continuously detected among the detection signals Sae, generates based on the detection signals Sae a third parameter by weighting only detection signals Sae temporally-discontinuously detected in correspondence with the movement of the balls among the detection signals Sae, and judges contents of an operational condition of the LM system using any one of the first, second or third parameter, is provided to enable prognosis of occurrences of failures in the LM system, to improve maintainability for a user of the LM system, and to contribute to the prolonging of the operation life of the LM system as well as performance assurance and quality improvement of apparatuses or devices incorporated with the LM system.

21 Claims, 12 Drawing Sheets

U.S. PATENT DOCUMENTS

| | | | |
|---|---|---|---|
| 5,014,547 A * | 5/1991 | Holroyd | 73/105 |
| 5,508,622 A * | 4/1996 | Gatzlaff et al. | 324/558 |
| 5,739,506 A * | 4/1998 | Hanton et al. | 219/645 |
| 6,142,026 A * | 11/2000 | Ohashi et al. | 73/865.9 |
| 2006/0111196 A1* | 5/2006 | Henry | 472/128 |
| 2008/0087149 A1* | 4/2008 | Ohashi | 83/73 |

FOREIGN PATENT DOCUMENTS

| | | |
|---|---|---|
| JP | 58-63832 A | 4/1983 |
| JP | 1-172621 A | 7/1989 |
| JP | 5-281094 A | 10/1993 |
| JP | 2004-184400 A | 7/2004 |

* cited by examiner

FIG. 1
Principle of the present invention
(a) 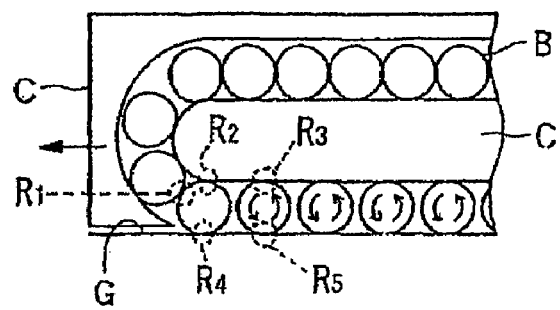
(b) 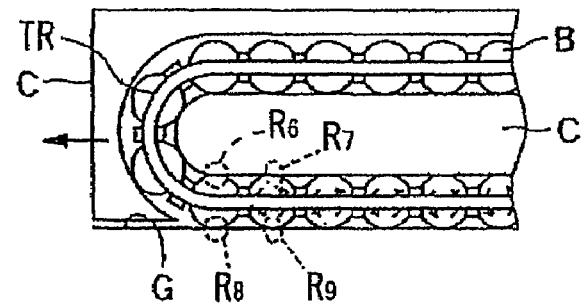
(c) 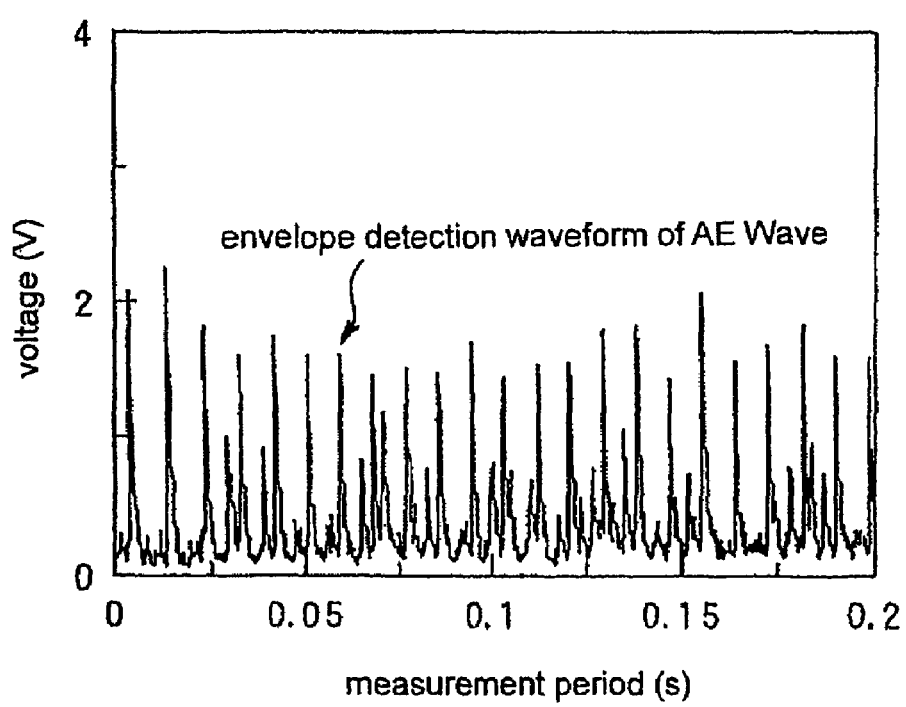

block diagram showing configuration of condition detection apparatus according to the present embodiment longitudinal sectional view showing configuration of AE sensor according to the present embodiment FIG. 5 diagram( I ) showing installation mode of AE sensor according to the present embodiment side view showing LM system including moving block according to the present embodiment FIG. 7 diagram(II) showing installation mode of AE sensor according to the present embodiment FIG. 9
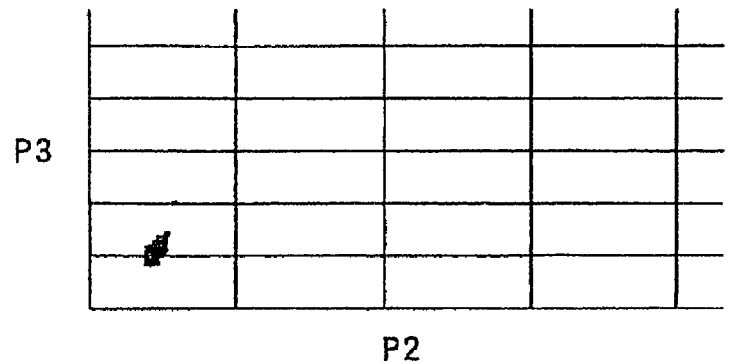
(a)
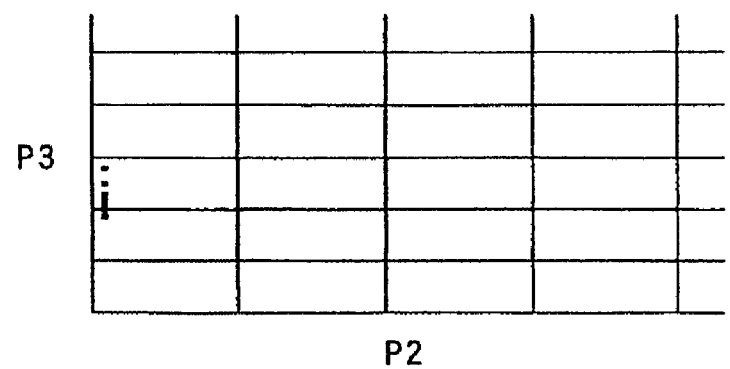
(b)
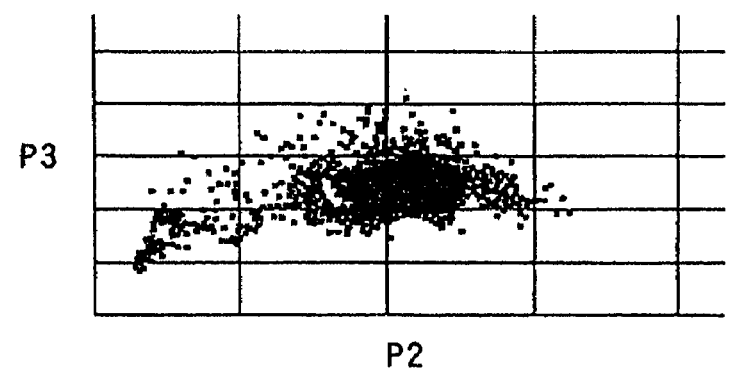
(c)

FIG. 10
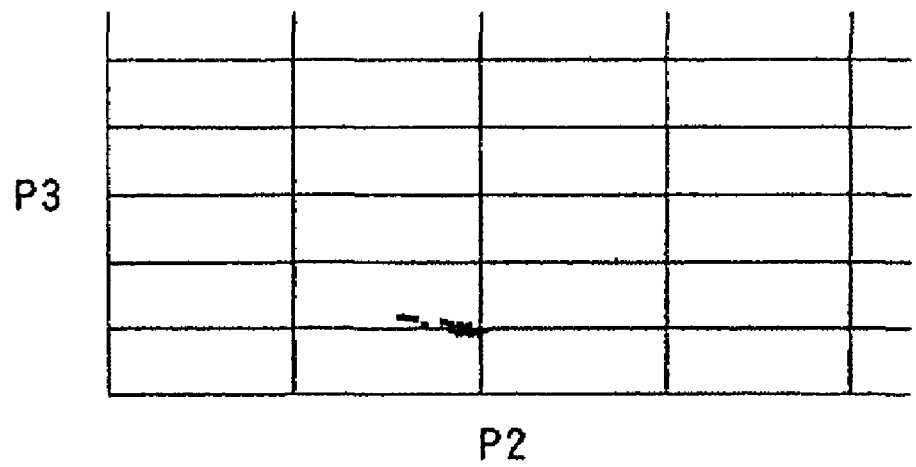
(a)
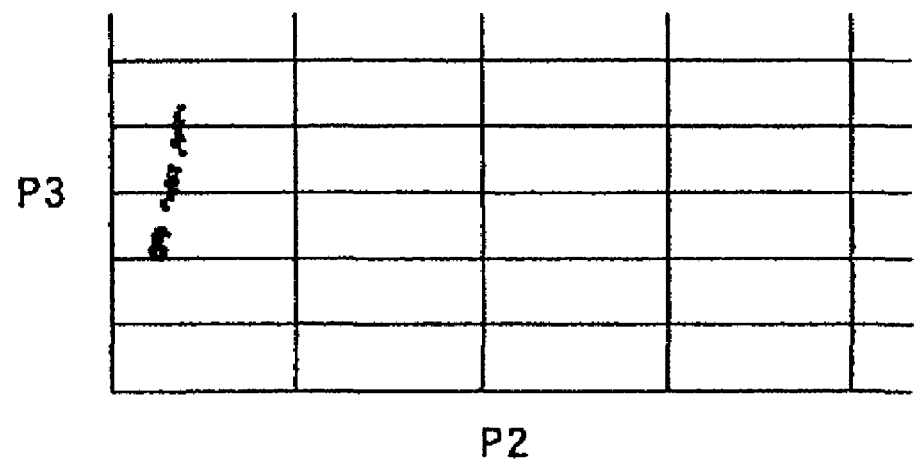
(b)

FIG. 12
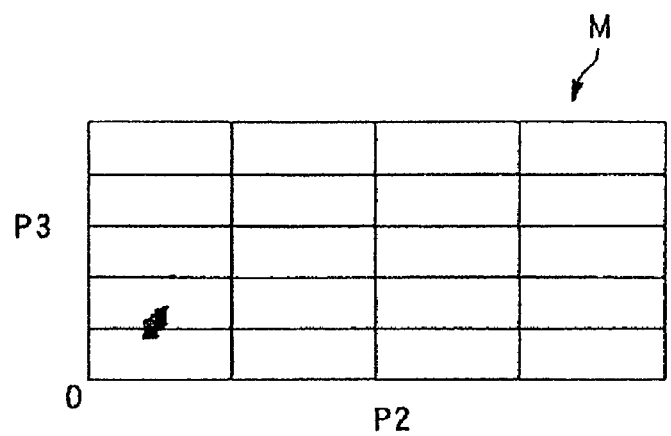
(a)
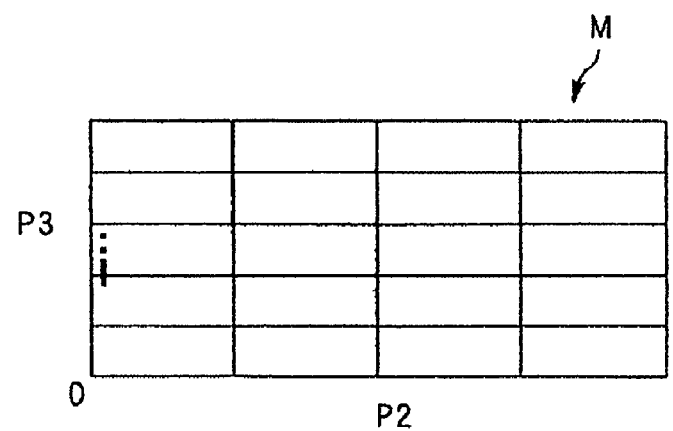
(b)
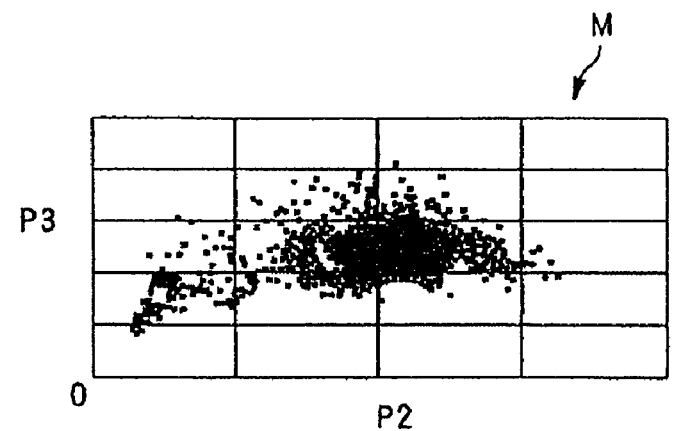
(c)

FIG. 13
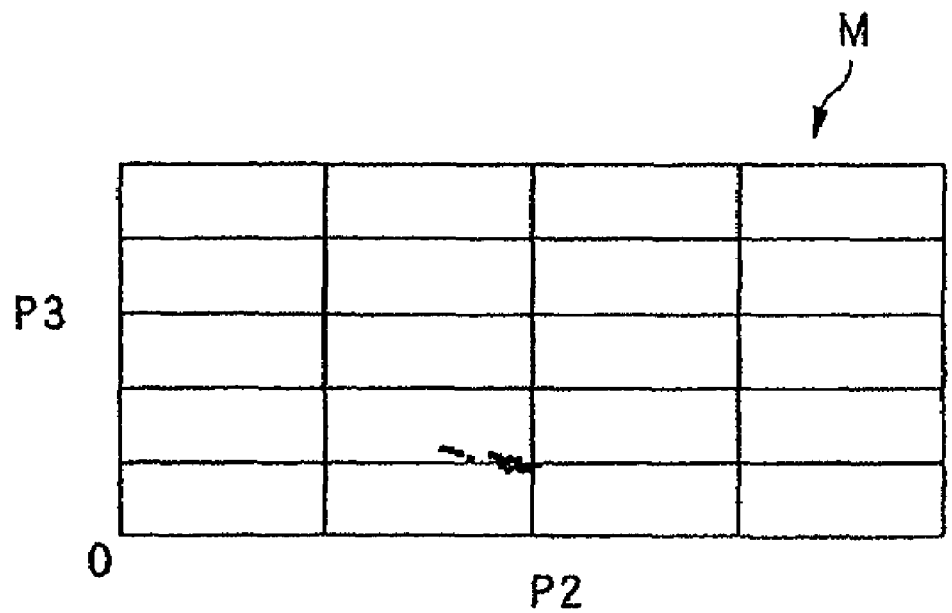
(a)
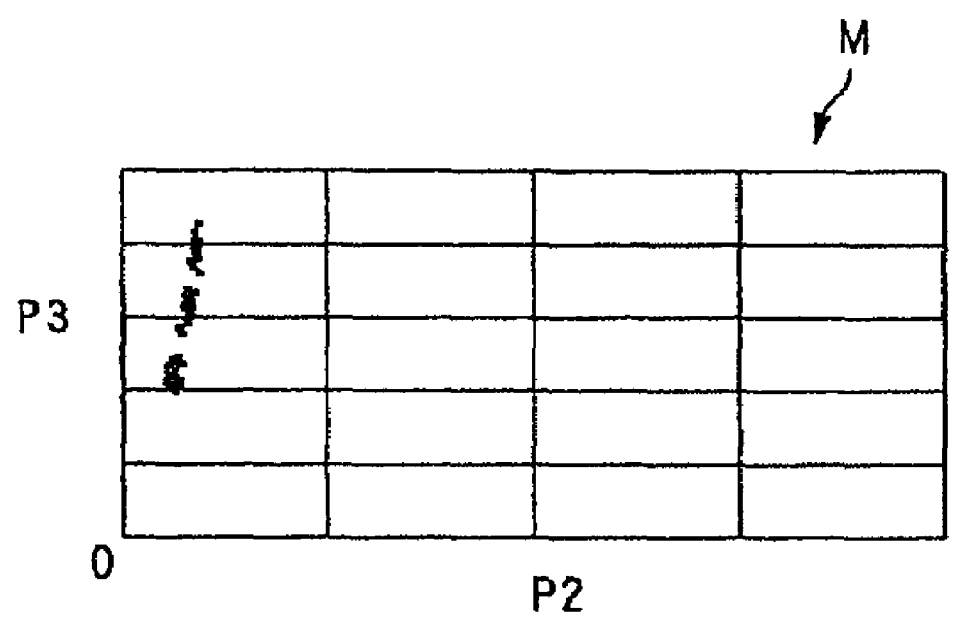
(b)

CONDITION DETECTION APPARATUS, CONDITION DETECTION METHOD, CONDITION DETECTION PROGRAM, INFORMATION RECORDING MEDIUM THEREFOR, AND CONDITION DISPLAY APPARATUS, CONDITION DISPLAY METHOD, CONDITION DISPLAY PROGRAM, INFORMATION RECORDING MEDIUM THEREFOR

TECHNICAL FIELD

The present invention is in a technical field of a condition detection apparatus, a condition detection method, a condition detection program, and an information recording medium therefor. More particularly, the present invention is in a technical field concerning a condition detection apparatus and method for detecting an operational condition of a linear rolling motion guide apparatus during operation thereof, a condition detection program for detecting such an operational condition, and also concerning an information recording medium on which the condition detection program is recorded so as to be computer-readable.

In addition, the present invention is in a technical field of a condition display apparatus, a condition display method, a condition display program, and an information recording medium therefor. More particularly, the present invention is in a technical field concerning a condition display apparatus and method for displaying an operational condition of a linear rolling motion guide apparatus during operation thereof, a condition display program for displaying such an operational condition, and also concerning an information recording medium on which the condition display program is recorded so as to be computer-readable.

BACKGROUND ART

Conventionally, so-called linear rolling motion guide apparatuses including a rail, a movable block moving longitudinally on the rail, and a plurality of self-rotating and circulating (revolving) balls (rolling members), disposed between the rail and movable block, which move the movable block at high accuracy, have been in widespread use. More specifically, such linear rolling motion guide apparatuses are widely utilized as members for supporting three-dimensional movement of work tables of machine tools, for supporting pendular motion of pendulum electric trains, and even in earthquake-absorbing structures of buildings. In addition to a configuration comprising the above-mentioned movable block and rail, some linear rolling motion guide apparatuses include so-called ball screws.

Such expansions of the scope of use of these linear rolling motion guide apparatuses have led to increased demands for the prevention of failures that occur in the apparatuses. There is also a demand for a diagnostic method that enables operational conditions of the apparatuses to be diagnosed with high accuracy.

Known diagnostic methods of operational conditions of conventional and general machine systems (for example, rotational rolling bearing apparatuses including ball bearings and the like), with the exception of linear rolling motion guide apparatuses, include: a vibration detecting method that diagnoses operational conditions by monitoring a vibration occurrence state in the machine system; an oil evaluation method that diagnoses operational conditions by retrieving lubrication oil used in the machine system and evaluating a quality of the retrieved lubrication oil; an electric resistance method that diagnoses operational conditions by measuring an electric resistance between members driven via the lubrication oil in the machine system; and a temperature measuring method that diagnoses operational conditions by using a thermocouple or the like to measure the temperature of a member driven via the lubrication oil in the machine system.

However, when these diagnostic methods are applied to a linear rolling motion guide apparatus, the following problems are encountered.

In the case of the vibration detecting method, since balls as rolling members are self-rotational and at the same time revolve within a circulation section in a linear rolling motion guide apparatus, many vibration sources exist. Hence, there is a problem in which vibrations attributable to abnormalities in the operational conditions, which should normally be detected, may not be accurately detected.

Additionally, the oil evaluation method requires lubricating oil to be respectively retrieved and inspected both before and after use of the linear rolling motion guide apparatus to be diagnosed. Thus, there is a problem in that additional time is required until diagnosis is obtained, and the linear rolling motion guide apparatus must be temporarily shut down in order to retrieve the lubricating oil, resulting in reduced operational efficiency.

Furthermore, the electric resistance method and the temperature measuring method are problematic in that both methods are vulnerable to electric noises and may be incapable of measurement in cases in which the movable block is moved at low speeds.

Therefore, it is difficult to accurately perform real-time diagnostics of operational conditions of linear rolling motion guide apparatuses using conventional methods.

The present invention has been conceived in consideration of the above circumstances, and an object thereof is to provide a condition detection apparatus, a condition detection method, a condition detection program for detecting operation condition, and an information recording medium on which the condition detection program is recorded so as to be computer-readable that: enable prognosis of occurrences of failures in a linear rolling motion guide apparatus by performing accurate real-time-detection of operational conditions of the linear rolling motion guide apparatus; and contribute to the improvement of maintainability for a user of the linear rolling motion guide apparatus, to prolonging the operation life of the apparatus, and to performance assurance and quality improvement of apparatuses or devices incorporated with the linear rolling motion guide apparatus.

An additional object of the present invention is to provide a condition display apparatus, a condition display method, a condition display program for detecting operation condition, and an information recording medium on which the condition display program is recorded so as to be computer-readable that: enable prognosis of occurrences of failures in a linear rolling motion guide apparatus by performing accurate real-time-display of operational conditions of the linear rolling motion guide apparatus; and contribute to the improvement of maintainability for a user of the linear rolling motion guide apparatus, to prolonging the operation life of the apparatus, and to performance assurance and quality improvement of apparatuses or devices incorporated with the linear rolling motion guide apparatus.

DISCLOSURE OF THE INVENTION

In order to achieve the above-described objects, an invention according to claim 1 is a condition detection apparatus that detects a current operational condition of a linear rolling motion guide apparatus, the condition detection apparatus comprising: a detection device such as an AE (Acoustic Emission) sensor or the like that detects elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at least either one of the rolling members or the rolling surface, occurring when a plurality of rolling members included in the linear rolling motion guide apparatus self-rotate and revolve at the same time, and generates an electric detection signal corresponding to a detected undulation; a first generation device such as a signal processing unit or the like that generates a first parameter indicating an intensity of the undulation based on the generated detection signal; and a judgment device such as a signal processing unit or the like that judges the operational condition to be normal when the generated value of the first parameter is below a first threshold that is preset for the first parameter.

By generating a first parameter that indicates an intensity of an undulation that elastically occurs due to an operation of the linear rolling motion guide apparatus, and by judging that the operational condition of the linear rolling motion guide apparatus is normal when the value of the first parameter is below a first threshold, real-time detection of whether the operational condition of the linear rolling motion guide apparatus is normal may be performed during operation thereof without having to dismantle the apparatus and while eliminating the influences of vibration attributable to such operations and vibration and the like attributable to an external drive apparatus.

In order to achieve the above-described objects, an invention according to claim 2 is the condition detection apparatus according to claim 1, further comprising: a second generation device such as a signal processing unit or the like that weights only detection signals temporally-continuously detected among the generated detection signals, based on the detection signals, to generate a second parameter; and a third generation device such as a signal processing unit or the like that weights only detection signals temporally-discontinuously detected in correspondence to the movement of the rolling members among the generated detection signals, and based on the detection signals, to generate a third parameter, wherein the judgment device is arranged to perform judgment on the above-described contents using at least either the second parameter or the third parameter when the generated value of the first parameter is equal to or greater than the first threshold.

Since contents of operational conditions are judged using a second parameter or a third parameter that differs from the first parameter in the event that the value of the first parameter is equal to or greater than the first threshold, judgment and detection of even specific contents of operational conditions may be performed more precisely.

In order to achieve the above-described objects, an invention according to claim 3 is the condition detection apparatus according to claim 2, arranged so that: if $X_i$ is a measurement obtained by sampling the detection signals and N is a total number of such measurements, then the first parameter $P_1$ is a parameter which may be expressed as $$P_1 = \sqrt{\frac{1}{N}\sum_{i=1}^{N}(X_i)^2}\ ; \quad \text{[Formula 1]}$$

if a constant K (volts) is a maximum input range at the detection device, then the second parameter $P_2$ is a parameter which may be expressed as $$P_2 = \frac{1}{\sqrt{\frac{1}{N}\sum_{i=1}^{N}(K-X_i)^2}}; \quad \text{[Formula 2]}$$

and if M is a number of extractions used as the measurement, then the third parameter $P_3$ is a parameter which may be expressed as $$P_3 = \frac{\sqrt{\frac{1}{M}\sum_{j=1}^{M}(X_j)^2}}{P_1}. \quad \text{[Formula 3]}$$

Therefore, since the first parameter $P_1$ is a parameter given by $$P_1 = \sqrt{\frac{1}{N}\sum_{i=1}^{N}(X_i)^2}, \quad \text{[Formula 4]}$$

the second parameter $P_2$ is a parameter given by $$P_2 = \frac{1}{\sqrt{\frac{1}{N}\sum_{i=1}^{N}(K-X_i)^2}}, \quad \text{[Formula 5]}$$

and the third parameter $P_3$ is a parameter given by $$P_3 = \frac{\sqrt{\frac{1}{M}\sum_{j=1}^{M}(X_j)^2}}{P_1}, \quad \text{[Formula 6]}$$

detection of specific contents of operational conditions may be performed more precisely.

In order to achieve the above-described objects, an invention according to claim 4 is the condition detection apparatus according to claim 2 or 3, wherein the judgment device is arranged to judge that the operational condition is a condition of insufficient lubrication in the event that the generated value of the first parameter is equal to or greater than the first threshold, the generated value of the second parameter is equal to or greater than a second threshold that is preset for the second parameter, and the generated value of the third parameter is below a third threshold that is preset for the third parameter.

Therefore, since the operational condition of the linear rolling motion guide apparatus is judged to be a condition of insufficient lubrication in the event that the value of the first parameter is equal to or greater than the first threshold, the value of the second parameter is equal to or greater than the second threshold, and the value of the third parameter is below the third threshold, real-time detection of whether the operational condition of the linear rolling motion guide apparatus is a condition of insufficient lubrication may be performed during operation thereof without having to dismantle the apparatus and while eliminating the influences of vibration attributable to such operations and vibration and the like attributable to an external drive apparatus.

In order to achieve the above-described objects, an invention according to claim 5 is the condition detection apparatus according to claim 2 or 3, wherein the judgment device is arranged to judge that the operational condition is a condition in which the circulation section is contaminated by a liquid other than the lubricant in the event that the generated value of the first parameter is equal to or greater than the first threshold, the generated value of the second parameter is equal to or greater than the second threshold that is preset for the second parameter, and the generated value of the third parameter is equal to or greater than the third threshold that is preset for the third parameter.

Therefore, since the operational condition of the linear rolling motion guide apparatus is judged to be a condition in which the circulation section is contaminated by a liquid other than the lubricant in the event that the value of the first parameter is equal to or greater than the first threshold, the value of the second parameter is equal to or greater than the second threshold, and the value of the third parameter is equal to or greater than the third threshold, real-time detection of whether the operational condition of the linear rolling motion guide apparatus is a condition in which the circulation section is contaminated by a liquid other than the lubricant may be performed during operation thereof without having to dismantle the apparatus and while eliminating the influences of vibration attributable to such operations and vibration and the like attributable to an external drive apparatus.

In order to achieve the above-described objects, an invention according to claim 6 is the condition detection apparatus according to claim 2 or 3, wherein the judgment device is arranged to judge that the operational condition is a condition in which a crack has occurred at least either one of the rolling members or the rolling surface in the event that the generated value of the first parameter is equal to or greater than the first threshold, the generated value of the second parameter is below the second threshold that is preset for the second parameter, and the generated value of the third parameter is equal to or greater than the third threshold that is preset for the third parameter.

Therefore, since the operational condition of the linear rolling motion guide apparatus is judged to be a condition in which a crack has occurred at least either one of the rolling members or the rolling surface in the event that the value of the first parameter is equal to or greater than the first threshold, the value of the second parameter is below the second threshold, and the value of the third parameter is equal to or greater than the third threshold, real-time detection of whether the operational condition of the linear rolling motion guide apparatus is a condition in which a crack has occurred at least either one of the rolling members or the rolling surface may be performed during operation thereof without having to dismantle the apparatus and while eliminating the influences of vibration attributable to such operations and vibration and the like attributable to an external drive apparatus.

In order to achieve the above-described objects, an invention according to claim 7 is the condition detection apparatus according to any one of the claims 1 to 6, further comprising a notification device that notifies any of the operational conditions judged by the judgment device.

Since notification of judgment results is performed by the notification device, the user of the linear rolling motion guide apparatus may readily acknowledge specific contents of operational conditions of the apparatus.

In order to achieve the above-described objects, an invention according to claim 8 is a condition detection method for detecting a current operational condition of a linear rolling motion guide apparatus, the condition detecting method arranged to comprise: a detection step for detecting elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at least either one of the rolling members or the rolling surface, occurring when a plurality of rolling members included in the linear rolling motion guide apparatus self-rotate and revolve at the same time, and generating an electric detection signal corresponding to a detected undulation; a first generation step for generating a first parameter indicating an intensity of the undulation based on the generated detection signal; and a judgment step for judging the operational condition to be normal when the generated value of the first parameter is below a first threshold that is preset for the first parameter.

By generating a first parameter that indicates an intensity of an undulation that elastically occurs due to an operation of the linear rolling motion guide apparatus, and by judging that the operational condition of the linear rolling motion guide apparatus is normal when the value of the first parameter is below a first threshold, real-time detection of whether the operational condition of the linear rolling motion guide apparatus is normal may be performed during operation thereof without having to dismantle the apparatus and while eliminating the influences of vibration attributable to such operations and vibration and the like attributable to an external drive apparatus.

In order to achieve the above-described objects, an invention according to claim 9 is the condition detection method according to claim 8, arranged to further comprise: a second generation step for weighting only detection signals temporally-continuously detected among the generated detection signals, based on the detection signals, to generate a second parameter; and a third generation step for weighting only detection signals temporally-discontinuously detected in correspondence to the movement of the rolling members among the generated detection signals, based on the detection signals, to generate a third parameter, wherein judgment is performed on the above-described contents in the judgment step using at least either the second parameter or the third parameter when the generated value of the first parameter is equal to or greater than the first threshold.

Since contents of operational conditions are judged using a second parameter or a third parameter that differs from the first parameter in the event that the value of the first parameter is equal to or greater than the first threshold, judgment and detection of even specific contents of operational conditions may be performed more precisely.

In order to achieve the above-described objects, an invention according to claim 10 is the condition detection method according to claim 9, arranged so that: if $X_i$ is a measurement obtained by sampling the detection signals and N is a total number of such measurements, then the first parameter $P_1$ is a parameter which may be expressed as $$P_1 = \sqrt{\frac{1}{N} \sum_{i=1}^{N} (X_i)^2} ; \qquad \text{[Formula 7]}$$

if a constant K (volts) is a maximum input range at the detection device, then the second parameter $P_2$ is a parameter which may be expressed as $$P_2 = \frac{1}{\sqrt{\frac{1}{N} \sum_{i=1}^{N} (K - X_i)^2}} ; \qquad \text{[Formula 8]}$$

and if M is a number of extractions used as the measurement, then the third parameter $P_3$ is a parameter which may be expressed as $$P_3 = \frac{\sqrt{\frac{1}{M} \sum_{j=1}^{M} (X_j)^2}}{P_1} . \qquad \text{[Formula 9]}$$

Therefore, since the first parameter $P_1$ is a parameter given by $$P_1 = \sqrt{\frac{1}{N} \sum_{i=1}^{N} (X_i)^2} , \qquad \text{[Formula 10]}$$

the second parameter $P_2$ is a parameter given by $$P_2 = \frac{1}{\sqrt{\frac{1}{N} \sum_{i=1}^{N} (K - X_i)^2}} , \qquad \text{[Formula 11]}$$

and the third parameter $P_3$ is a parameter given by $$P_3 = \frac{\sqrt{\frac{1}{M} \sum_{j=1}^{M} (X_j)^2}}{P_1} , \qquad \text{[Formula 12]}$$

detection of specific contents of operational conditions may be performed more precisely.

In order to achieve the above-described objects, an invention according to claim 11 is the condition detection method according to claim 9 or 10, wherein the operational condition is judged in the judgment step to be a condition of insufficient lubrication in the event that the generated value of the first parameter is equal to or greater than the first threshold, the generated value of the second parameter is equal to or greater than a second threshold that is preset for the second parameter, and the generated value of the third parameter is below a third threshold that is preset for the third parameter.

Therefore, since the operational condition of the linear rolling motion guide apparatus is judged to be a condition of insufficient lubrication in the event that the value of the first parameter is equal to or greater than the first threshold, the value of the second parameter is equal to or greater than the second threshold, and the value of the third parameter is below a third threshold, real-time detection of whether the operational condition of the linear rolling motion guide apparatus is a condition of insufficient lubrication may be performed during operation thereof without having to dismantle the apparatus and while eliminating the influences of vibration attributable to such operations and vibration and the like attributable to an external drive apparatus.

In order to achieve the above-described objects, an invention according to claim 12 is the condition detection method according to claim 9 or 10, wherein the operational condition is judged in the judgment step to be a condition in which the circulation section is contaminated by a liquid other than the lubricant in the event that the generated value of the first parameter is equal to or greater than the first threshold, the generated value of the second parameter is equal to or greater than the second threshold that is preset for the second parameter, and the generated value of the third parameter is equal to or greater than the third threshold that is preset for the third parameter.

Therefore, since the operational condition of the linear rolling motion guide apparatus is judged to be a condition in which the circulation section is contaminated by a liquid other than the lubricant in the event that the value of the first parameter is equal to or greater than the first threshold, the value of the second parameter is equal to or greater than the second threshold, and the value of the third parameter is equal to or greater than the third threshold, real-time detection of whether the operational condition of the linear rolling motion guide apparatus is a condition in which the circulation section is contaminated by a liquid other than the lubricant may be performed during operation thereof without having to dismantle the apparatus and while eliminating the influences of vibration attributable to such operations and vibration and the like attributable to an external drive apparatus.

In order to achieve the above-described objects, an invention according to claim 13 is the condition detection method according to claim 9 or 10, wherein the operational condition is judged in the judgment step to be a condition in which a crack has occurred at least either one of the rolling members or the rolling surface in the event that the generated value of the first parameter is equal to or greater than the first threshold, the generated value of the second parameter is below the second threshold that is preset for the second parameter, and the generated value of the third parameter is equal to or greater than the third threshold that is preset for the third parameter.

Therefore, since the operational condition of the linear rolling motion guide apparatus is judged to be a condition in which a crack has occurred at least either one of the rolling members or the rolling surface in the event that the value of the first parameter is equal to or greater than the first threshold, the value of the second parameter is below the second threshold, and the value of the third parameter is equal to or greater than the third threshold, real-time detection of whether the operational condition of the linear rolling motion guide apparatus is a condition in which a crack has occurred at least either one of the rolling members or the rolling surface may be performed during operation thereof without having to dismantle the apparatus and while eliminating the influences of vibration attributable to such operations and vibration and the like attributable to an external drive apparatus.

In order to achieve the above-described objects, an invention according to claim 14 is the condition detection method according to any one of the claims 8 to 13, further comprising a notification step for notifying any of the operational conditions judged in the judgment step.

Since notification of judgment results is performed in the notification step, the user of the linear rolling motion guide apparatus may readily acknowledge specific contents of operational conditions of the apparatus.

In order to achieve the above-described objects, an invention according to claim 15 is arranged so as to enable a computer included in a condition detection apparatus that detects a current operational condition of a linear rolling motion guide apparatus to function as: a detection device that detects elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at least either one of the rolling members or the rolling surface, occurring when a plurality of rolling members included in the linear rolling motion guide apparatus self-rotate and revolve at the same time, and generates an electric detection signal corresponding to a detected undulation; a first generation device that generates a first parameter indicating an intensity of the undulation based on the generated detection signal; a second generation device that weights only detection signals temporally-continuously detected among the generated detection signals, based on the detection signals, to generate a second parameter; a third generation device that weights only detection signals temporally-discontinuously detected in correspondence to movement of the rolling members among the generated detection signals, based on the detection signals, to generate a third parameter; and a judgment device that judges contents of the operational condition using at least any one of the first parameter, the second parameter or the third parameter.

Since the computer functions so as to judge contents of operational conditions of the linear rolling motion guide apparatus using at least any one of the first parameter, the second parameter or the third parameter, real-time detection of even the contents of the operational conditions of the linear rolling motion guide apparatus may be performed during operation thereof without having to dismantle the apparatus and while eliminating the influences of vibration attributable to such operations and vibration and the like attributable to an external drive apparatus.

In order to achieve the above-described objects, an invention of claim 16 is the condition detection program according to claim 15, wherein the program is recorded so as to be computer-readable.

Since the computer functions so as to judge contents of operational conditions of the linear rolling motion guide apparatus using any one of the first parameter, the second parameter or the third parameter when the condition detection program is read out from the computer and executed, real-time detection of even the contents of the operational conditions of the linear rolling motion guide apparatus may be performed during operation thereof without having to dismantle the apparatus and while eliminating the influences of vibration attributable to such operations and vibration and the like attributable to an external drive apparatus.

In order to achieve the above-described objects, an invention according to claim 17 is a condition display apparatus that displays a current operational condition of a linear rolling motion guide apparatus, the condition display apparatus comprising: a detection device such as an AE (acoustic emission) sensor or the like that detects elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at least either one of the rolling members or the rolling surface, occurring when a plurality of rolling members included in the linear rolling motion guide apparatus self-rotate and revolve at the same time, and generates an electric detection signal corresponding to a detected undulation; a sampling device such as a signal processing unit or the like that samples the generated detection signals and generates detection data; a first generation device such as a signal processing unit or the like that respectively generates, based on respective detection data contained in detection data groups composed of a plurality of detection data obtained during a preset detection period, a first parameter obtained by performing weighting on only detection data corresponding to detection signals that have been temporally-continuously detected among the generated detection signals, for each of a plurality of detection data groups corresponding to different detection periods; a second generation device such as a signal processing unit or the like that respectively generates, based on respective detection data contained in the detection data groups, a second parameter obtained by performing weighting on only detection data corresponding to detection signals that have been temporally-discontinuously detected in correspondence to movement of the rolling members among the generated detection signals, for each of the plurality of detection data groups corresponding to the different detection periods; and a display control device such as a signal processing unit or the like that displays a graph, obtained by using a value of the first parameter and a value of the second parameter obtained for each single detection data group and repeating for each detected data group a procedure in which the single detection data group is displayed as a single plot point on a graph using values of the first parameter as a first axis and values of the second parameter as a second axis, onto a display device such as a display section or the like.

By displaying a graph that is obtained by using a value of the first parameter and a value of the second parameter obtained for a single detection data group and repeating for each detected data group a procedure in which a single detection data group is displayed as a single plot point on the graph that uses values of the first parameter as a first axis and values of the second parameter as a second axis, the user of the linear rolling motion guide apparatus may acknowledge current operational conditions of the apparatus.

In order to achieve the above-described objects, an invention according to claim 18 is the condition display apparatus according to claim 17, arranged so that: if $X_i$ is a value of each detection data, N is a total number of detection data contained in the corresponding detection data group, and a constant K (volts) is a maximum input range at the detection device, then the first parameter $P_2$ is a parameter which may be expressed as $$P_2 = \frac{1}{\sqrt{\frac{1}{N}\sum_{i=1}^{N}(K-X_i)^2}};$$ [Formula 13]

and if M is a number of extractions used as the detection data, then the second parameter $P_3$ is a parameter which may be expressed as $$P_3 = \frac{\sqrt{\frac{1}{M}\sum_{j=1}^{M}(X_j)^2}}{P_1}.$$ [Formula 14]

Therefore, since the first parameter $P_2$ is a parameter given by $$P_2 = \frac{1}{\sqrt{\frac{1}{N}\sum_{i=1}^{N}(K-X_i)^2}}$$ [Formula 15]

and the second parameter $P_3$ is a parameter given by $$P_3 = \frac{\sqrt{\frac{1}{M}\sum_{j=1}^{M}(X_j)^2}}{P_1},$$ [Formula 16]

detection of specific contents of operational conditions may be performed more precisely.

In order to achieve the above-described objects, an invention according to claim 19 is a condition display method for displaying a current operational condition of a linear rolling motion guide apparatus, the condition display method comprising: a detection step for detecting elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at least either one of the rolling members or the rolling surface, occurring when a plurality of rolling members included in the linear rolling motion guide apparatus self-rotate and revolve at the same time, and generating an electric detection signal corresponding to a detected undulation; a sampling step for sampling the generated detection signals and generating detection data; a first generation step for respectively generating, based on respective detection data contained in detection data groups composed of a plurality of detection data obtained during a preset detection period, a first parameter obtained by performing weighting on only detection data corresponding to detection signals that have been temporally-continuously detected among the generated detection signals, for each of a plurality of detection data groups corresponding to different detection periods; a second generation step for respectively generating, based on respective detection data contained in the detection data groups, a second parameter obtained by performing weighting on only detection data corresponding to detection signals that have been temporally-discontinuously detected in correspondence to movement of the rolling members among the generated detection signals, for each of the plurality of detection data groups corresponding to the different detection periods; and a display control step for displaying a graph, obtained by using a value of the first parameter and a value of the second parameter obtained for each single detection data group and repeating for each detected data group a procedure in which the single detection data group is displayed as a single plot point on a graph using values of the first parameter as a first axis and values of the second parameter as a second axis, onto a display device such as a display section or the like.

By displaying a graph that is obtained by using a value of the first parameter and a value of the second parameter obtained for a single detection data group and repeating for each detected data group a procedure in which the single detection data group is displayed as a single plot point on the graph which uses values of the first parameter as a first axis and values of the second parameter as a second axis, the user of the linear rolling motion guide apparatus may acknowledge current operational conditions of the apparatus.

In order to achieve the above-described objects, an invention according to claim 20 is the condition display method according to claim 19, arranged so that: if $X_i$ is a value of each detection data, N is a total number of detection data contained in the corresponding detection data group, and a constant K (volts) is a maximum input range at the detection device, then the first parameter $P_2$ is a parameter which may be expressed as $$P_2 = \frac{1}{\sqrt{\frac{1}{N}\sum_{i=1}^{N}(K-X_i)^2}};$$ [Formula 17]

and if M is a number of extractions used as the detection data, then the second parameter $P_3$ is a parameter which may be expressed as $$P_3 = \frac{\sqrt{\frac{1}{M}\sum_{j=1}^{M}(X_j)^2}}{P_1}.$$ [Formula 18]

Therefore, since the first parameter $P_2$ is a parameter given by $$P_2 = \frac{1}{\sqrt{\frac{1}{N}\sum_{i=1}^{N}(K-X_i)^2}}$$ [Formula 19]

and the second parameter $P_3$ is a parameter given by $$P_3 = \frac{\sqrt{\frac{1}{M}\sum_{j=1}^{M}(X_j)^2}}{P_1},$$ [Formula 20]

detection of specific contents of operational conditions may be performed more precisely.

In order to achieve the above-described objects, an invention according to claim 21 is arranged so as to enable a computer included in a condition display apparatus that display a current operational condition of a linear rolling motion guide apparatus to function as: a detection device that detects elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at least either one of the rolling members or the rolling surface, occurring when a plurality of rolling members included in the linear rolling motion guide apparatus self-rotate and revolve at the same time, and generates an electric detection signal corresponding to a detected undulation; a sampling device that samples the generated detection signals and generates detection data; a first generation device that respectively generates, based on respective detection data contained in detection data groups composed of a plurality of detection data obtained during a preset detection period, a first parameter obtained by performing weighting on only detection data corresponding to detection signals that have been temporally-continuously detected among the generated detection signals, for each of a plurality of detection data groups corresponding to different detection periods; a second generation device that respectively generates, based on respective detection data contained in the detection data groups, a second parameter obtained by performing weighting on only detection data corresponding to detection signals that have been temporally-discontinuously detected in correspondence to movement of the rolling members among the generated detection signals, for each of the plurality of detection data groups corresponding to the different detection periods; and a display control device that displays a graph, obtained by using a value of the first parameter and a value of the second parameter obtained for each single detection data group and repeating for each detected data group a procedure in which the single detection data group is displayed as a single plot point on a graph using values of the first parameter as a first axis and values of the second parameter as a second axis, onto a display device such as a display section or the like.

Since the computer functions so as to display a graph that is obtained by using a value of the first parameter and a value of the second parameter obtained for a single detection data group and repeating for each detected data group a procedure in which a single detection data group is displayed as a single plot point on the graph which uses values of the first parameter as a first axis and values of the second parameter as a second axis, the user of the linear rolling motion guide apparatus may acknowledge current operational conditions of the apparatus.

In order to achieve the above-described objects, an invention of claim 22 is the condition display program according to claim 21, wherein the program is recorded so as to be computer-readable.

Since the computer functions so as to display a graph that is obtained by using a value of the first parameter and a value of the second parameter obtained for a single detection data group and repeating for each detected data group a procedure in which a single detection data group is displayed as a single plot point on the graph which uses values of the first parameter as a first axis and values of the second parameter as a second axis when the condition detection program is read out from the computer and executed, the user of the linear rolling motion guide apparatus may acknowledge current operational conditions of the apparatus.

According to the invention of claim 1, by generating a first parameter that indicates an intensity of an undulation that elastically occurs due to an operation of the linear rolling motion guide apparatus, and by judging that the operational condition of the linear rolling motion guide apparatus is normal when the value of the first parameter is below a first threshold, real-time detection of whether the operational condition of the linear rolling motion guide apparatus is normal may be performed during operation thereof without having to dismantle the apparatus and while eliminating the influences of vibration attributable to such operations and vibration and the like attributable to an external drive apparatus.

Accordingly, prognosis of occurrences of failures in the linear rolling motion guide apparatus may be performed, maintainability for a user of the linear rolling motion guide apparatus may be improved, and contributions may be made to prolonging the operation life of the apparatus and realizing performance assurance and quality improvement of apparatuses or devices manufactured by utilizing such linear rolling motion guide apparatuses.

According to the invention of claim 2, in addition to the advantages achieved by the invention according to claim 1, since contents of operational conditions are judged using a second parameter or a third parameter that differ from the first parameter in the event that the first parameter is equal to or greater than the first threshold, judgment and detection of even specific contents of operational conditions may be performed more precisely.

According to the invention of claim 3, in addition to the advantages achieved by the invention according to claim 2, since the first parameter $P_1$ is a parameter given by $$P_1 = \sqrt{\frac{1}{N}\sum_{i=1}^{N}(X_i)^2}, \qquad \text{[Formula 21]}$$

the second parameter $P_2$ is a parameter given by $$P_2 = \frac{1}{\sqrt{\frac{1}{N}\sum_{i=1}^{N}(K-X_i)^2}}, \qquad \text{[Formula 22]}$$

and the third parameter $P_3$ is a parameter given by $$P_3 = \frac{\sqrt{\frac{1}{M}\sum_{j=1}^{M}(X_j)^2}}{P_1}, \qquad \text{[Formula 23]}$$

detection of specific contents of operational conditions may be performed more precisely.

According to the invention of claim 4, in addition to the advantages achieved by the invention according to claim 2 or 3, since the operational condition of the linear rolling motion guide apparatus is judged to be a condition of insufficient lubrication in the event that the value of the first parameter is equal to or greater than the first threshold, the value of the second parameter is equal to or greater than the second threshold, and the value of the third parameter is below a third threshold, real-time detection of whether the operational condition of the linear rolling motion guide apparatus is a condition of insufficient lubrication may be performed during operation thereof without having to dismantle the apparatus and while eliminating the influences of vibration attributable to such operations and vibration and the like attributable to an external drive apparatus.

According to the invention of claim 5, in addition to the advantages achieved by the invention according to claim 2 or 3, since the operational condition of the linear rolling motion guide apparatus is judged to be a condition in which the circulation section is contaminated by a liquid other than the lubricant in the event that the value of the first parameter is equal to or greater than the first threshold, the value of the second parameter is equal to or greater than the second threshold, and the value of the third parameter is equal to or greater than the third threshold, real-time detection of whether the operational condition of the linear rolling motion guide apparatus is a condition in which the circulation section is contaminated by a liquid other than the lubricant may be performed during operation thereof without having to dismantle the apparatus and while eliminating the influences of vibration attributable to such operations and vibration and the like attributable to an external drive apparatus.

According to the invention of claim 6, in addition to the advantages achieved by the invention according to claim 2 or 3, since the operational condition of the linear rolling motion guide apparatus is judged to be a condition in which a crack has occurred at least either one of the rolling members or the rolling surface in the event that the value of the first parameter is equal to or greater than the first threshold, the value of the second parameter is below the second threshold, and the value of the third parameter is equal to or greater than the third threshold, real-time detection of whether the operational condition of the linear rolling motion guide apparatus is a condition in which a crack has occurred at least either one of the rolling members or the rolling surface may be performed during operation thereof without having to dismantle the apparatus and while eliminating the influences of vibration attributable to such operations and vibration and the like attributable to an external drive apparatus.

According to the invention of claim 7, in addition to the advantages achieved by the invention according to any one of the claims 1 to 6, since notification of judgment results is performed by the notification device, the user of the linear rolling motion guide apparatus may readily acknowledge specific contents of operational conditions of the apparatus.

According to the invention of claim 8, by generating a first parameter that indicates an intensity of an undulation that elastically occurs due to an operation of the linear rolling motion guide apparatus, and by judging that the operational condition of the linear rolling motion guide apparatus is normal when the value of the first parameter is below a first threshold, real-time detection of whether the operational condition of the linear rolling motion guide apparatus is normal may be performed during operation thereof without having to dismantle the apparatus and while eliminating the influences of vibration attributable to such operations and vibration and the like attributable to an external drive apparatus.

Accordingly, prognosis of occurrences of failures in the linear rolling motion guide apparatus may be performed, maintainability for a user of the linear rolling motion guide apparatus may be improved, and contributions may be made to prolonging the operation life of the apparatus and realizing performance assurance and quality improvement of apparatuses or devices manufactured by utilizing such linear rolling motion guide apparatuses.

According to the invention of claim 9, in addition to the advantages achieved by the invention according to claim 8, since contents of operational conditions are judged using a second parameter or a third parameter that differ from the first parameter in the event that the value of the first parameter is equal to or greater than the first threshold, judgment and detection of even specific contents of operational conditions may be performed more precisely.

According to the invention of claim 10, in addition to the advantages achieved by the invention according to claim 9, since the first parameter $P_1$ is a parameter given by $$P_1 = \sqrt{\frac{1}{N}\sum_{i=1}^{N}(X_i)^2}, \qquad \text{[Formula 24]}$$

the second parameter $P_2$ is a parameter given by $$P_2 = \frac{1}{\sqrt{\frac{1}{N}\sum_{i=1}^{N}(K-X_i)^2}}, \qquad \text{[Formula 25]}$$

and the third parameter $P_3$ is a parameter given by $$P_3 = \frac{\sqrt{\frac{1}{M}\sum_{j=1}^{M}(X_j)^2}}{P_1}, \qquad \text{[Formula 26]}$$

detection of specific contents of operational conditions may be performed more precisely.

According to the invention of claim 11, in addition to the advantages achieved by the invention according to claim 9 or 10, since the operational condition of the linear rolling motion guide apparatus is judged to be a condition of insufficient lubrication in the event that the value of the first parameter is equal to or greater than the first threshold, the value of the second parameter is equal to or greater than the second threshold, and the value of the third parameter is below a third threshold, real-time detection of whether the operational condition of the linear rolling motion guide apparatus is a condition of insufficient lubrication may be performed during operation thereof without having to dismantle the apparatus and while eliminating the influences of vibration attributable to such operations and vibration and the like attributable to an external drive apparatus.

According to the invention of claim 12, in addition to the advantages achieved by the invention according to claim 9 or 10, since the operational condition of the linear rolling motion guide apparatus is judged to be a condition in which the circulation section is contaminated by a liquid other than the lubricant in the event that the value of the first parameter is equal to or greater than the first threshold, the value of the second parameter is equal to or greater than the second threshold, and the value of the third parameter is equal to or greater than the third threshold, real-time detection of whether the operational condition of the linear rolling motion guide apparatus is a condition in which the circulation section is contaminated by a liquid other than the lubricant may be performed during operation thereof without having to dismantle the apparatus and while eliminating the influences of vibration attributable to such operations and vibration and the like attributable to an external drive apparatus.

According to the invention of claim 13, in addition to the advantages achieved by the invention according to claim 9 or 10, since the operational condition of the linear rolling motion guide apparatus is judged to be a condition in which a crack has occurred at least either one of the rolling members or the rolling surface in the event that the value of the first parameter is equal to or greater than the first threshold, the value of the second parameter is below the second threshold, and the value of the third parameter is equal to or greater than the third threshold, real-time detection of whether the operational condition of the linear rolling motion guide apparatus is a condition in which a crack has occurred at least either one of the rolling members or the rolling surface may be performed during operation thereof without having to dismantle the apparatus and while eliminating the influences of vibration attributable to such operations and vibration and the like attributable to an external drive apparatus.

According to the invention of claim 14, in addition to the advantages achieved by the invention according to any one of the claims 8 to 13, since notification of judgment results is performed in the notification step, the user of the linear rolling motion guide apparatus may readily acknowledge specific contents of operational conditions of the apparatus.

According to the invention of claim 15, since the computer functions so as to judge contents of operational conditions of the linear rolling motion guide apparatus using any one of the first parameter, the second parameter or the third parameter, real-time detection of even the contents of the operational conditions of the linear rolling motion guide apparatus may be performed during operation thereof without having to dismantle the apparatus and while eliminating the influences of vibration attributable to such operations and vibration and the like attributable to an external drive apparatus.

Accordingly, prognosis of occurrences of failures in the linear rolling motion guide apparatus may be performed, maintainability for a user of the linear rolling motion guide apparatus may be improved, and contributions may be made to prolonging the operation life of the apparatus and realizing performance assurance and quality improvement of apparatuses or devices manufactured by utilizing such linear rolling motion guide apparatuses.

According to the invention of claim 16, by reading out the condition detection program according to claim 15 from the computer and executing the program, the computer functions so as to judge contents of operational conditions of the linear rolling motion guide apparatus using any one of the first parameter, the second parameter or the third parameter, thereby enabling real-time detection of even the contents of the operational conditions of the linear rolling motion guide apparatus to be performed during operation thereof without having to dismantle the apparatus and while eliminating the influences of vibration attributable to such operations and vibration and the like attributable to an external drive apparatus.

Accordingly, prognosis of occurrences of failures in the linear rolling motion guide apparatus may be performed, maintainability for a user of the linear rolling motion guide apparatus may be improved, and contributions may be made to prolonging the operation life of the apparatus and realizing performance assurance and quality improvement of apparatuses or devices manufactured by utilizing such linear rolling motion guide apparatuses.

According to the invention of claim 17, by displaying a graph that is obtained by using a value of the first parameter and a value of the second parameter obtained for a single detection data group and repeating for each detected data group a procedure in which a single detection data group is displayed as a single plot point on the graph which uses values of the first parameter as a first axis and values of the second parameter as a second axis, the user of the linear rolling motion guide apparatus may acknowledge current operational conditions of the apparatus.

Accordingly, since prognosis of occurrences of failures in the linear rolling motion guide apparatus may be performed using the graph, maintainability for a user of the linear rolling motion guide apparatus may be improved, and contributions may be made to prolonging the operation life of the apparatus and realizing performance assurance and quality improvement of apparatuses or devices manufactured by utilizing such linear rolling motion guide apparatuses.

According to the invention of claim 18, in addition to the advantages achieved by the invention according to claim 17, since the first parameter $P_2$ is a parameter given by $$P_2 = \frac{1}{\sqrt{\frac{1}{N}\sum_{i=1}^{N}(K-X_i)^2}} \quad \text{[Formula 27]}$$

the second parameter $P_3$ is a parameter given by $$P_3 = \frac{\sqrt{\frac{1}{M}\sum_{j=1}^{M}(X_j)^2}}{P_1}, \quad \text{[Formula 28]}$$

detection of specific contents of operational conditions may be performed more precisely.

According to the invention of claim 19, by displaying a graph that is obtained by using a value of the first parameter and a value of the second parameter obtained for a single detection data group and repeating for each detected data group a procedure in which a single detection data group is displayed as a single plot point on the graph which uses values of the first parameter as a first axis and values of the second parameter as a second axis, the user of the linear rolling motion guide apparatus may acknowledge current operational conditions of the apparatus.

Accordingly, since prognosis of occurrences of failures in the linear rolling motion guide apparatus may be performed using the graph, maintainability for a user of the linear rolling motion guide apparatus may be improved, and contributions may be made to prolonging the operation life of the apparatus and realizing performance assurance and quality improvement of apparatuses or devices manufactured by utilizing such linear rolling motion guide apparatuses.

According to the invention of claim 20, in addition to the advantages achieved by the invention according to claim 19, since the first parameter $P_2$ is a parameter given by $$P_2 = \frac{1}{\sqrt{\frac{1}{N}\sum_{i=1}^{N}(K-X_i)^2}} \quad \text{[Formula 29]}$$

and the second parameter $P_3$ is a parameter given by $$P_3 = \frac{\sqrt{\frac{1}{M}\sum_{j=1}^{M}(X_j)^2}}{P_1},\quad\text{[Formula 30]}$$

detection of specific contents of operational conditions may be performed more precisely.

According to the invention of claim 21, since the computer functions so as to display a graph that is obtained by using a value of the first parameter and a value of the second parameter obtained for a single detection data group and repeating for each detected data group a procedure in which a single detection data group is displayed as a single plot point on the graph which uses values of the first parameter as a first axis and values of the second parameter as a second axis, the user of the linear rolling motion guide apparatus may acknowledge current operational conditions of the apparatus.

Accordingly, since prognosis of occurrences of failures in the linear rolling motion guide apparatus may be performed using the graph, maintainability for a user of the linear rolling motion guide apparatus may be improved, and contributions may be made to prolonging the operation life of the apparatus and realizing performance assurance and quality improvement of apparatuses or devices manufactured by utilizing such linear rolling motion guide apparatuses.

According to the invention of claim 22, by reading out the condition display program according to claim 21 from the computer and executing the program, the computer functions so as to display a graph that is obtained by using a value of the first parameter and a value of the second parameter obtained for a single detection data group and repeating for each detected data group a procedure in which a single detection data group is displayed as a single plot point on the graph which uses values of the first parameter as a first axis and values of the second parameter as a second axis, thereby enabling the user of the linear rolling motion guide apparatus to acknowledge current operational conditions of the apparatus.

Accordingly, since prognosis of occurrences of failures in the linear rolling motion guide apparatus may be performed using the graph, maintainability for a user of the linear rolling motion guide apparatus may be improved, and contributions may be made to prolonging the operation life of the apparatus and realizing performance assurance and quality improvement of apparatuses or devices manufactured by utilizing such linear rolling motion guide apparatuses.

BRIEF DESCRIPTION OF THE DRAWINGS

FIG. 1 is a diagram describing the principle of the present invention, in which (a) and (b) are views showing generation of en extended AE wave according to first and second embodiments of the present invention while (c) is an example of an envelope detection waveform corresponding to the extended AE wave;

FIG. 9 is a diagram (I) showing a first example according to the present invention, in which (a) and (b) are diagrams showing plot examples in a case in which lubrication is satisfactory and operational conditions are normal, while (c) is a diagram showing a plot example in a case in which contamination by a liquid other than the lubricant has occurred;

FIG. 10 is a diagram (II) showing the first example according to the present invention, in which (a) is a diagram showing a plot example in a case in which lubrication is insufficient, while (b) is a diagram showing a plot example in a case in which a crack has occurred;

FIG. 12 is a diagram (I) showing a second example according to the present invention, in which (a) and (b) are diagrams showing plot examples in a case in which lubrication is satisfactory and operational conditions are normal, while (c) is a diagram showing a plot example in a case in which contamination by a liquid other than the lubricant has occurred; and FIG. 13 is a diagram (II) showing the second example according to the present invention, in which (a) is a diagram showing a plot example in a case in which lubrication is insufficient, while (b) is a diagram showing a plot example in a case in which a crack has occurred.

BEST MODE FOR CARRYING OUT THE INVENTION

Figure 2:
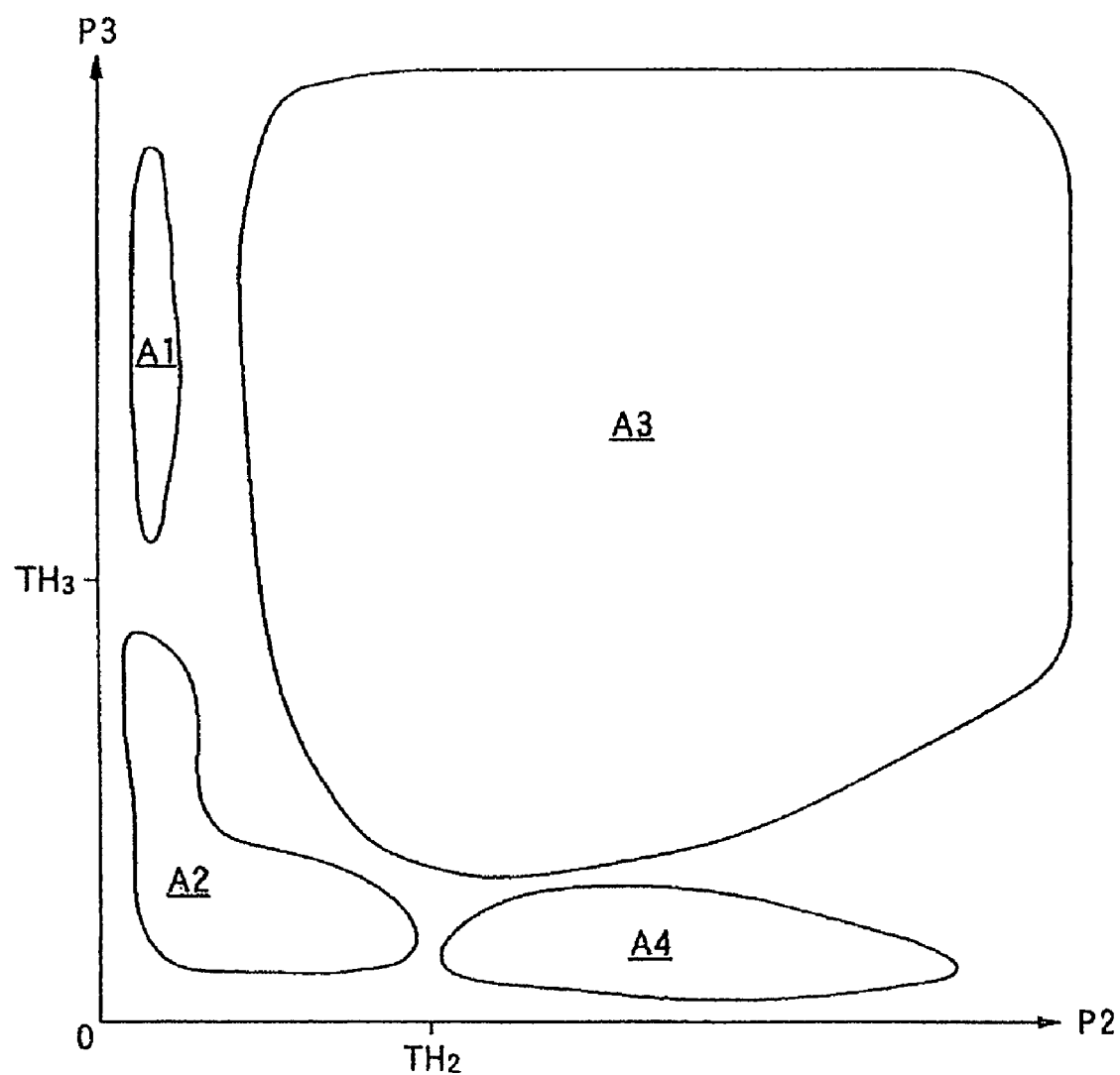
FIG. 2 is a graph chart showing a relationship between parameters and operational conditions according to the principle of the present invention.

Preferred embodiments of the present invention will now be described with reference to the accompanying drawings.

In the embodiments described hereinafter, the present invention is applied to detection and diagnosis of an operational condition of a linear rolling motion guide apparatus (hereinafter simply referred to as an LM [Linear Motion] System, which, more specifically, includes a linear motion system such as a so-called LM guide, ball spline and the like).

(I) Principle of the Invention

First, before proceeding to a specific description of embodiments of the present invention, the principle of the present invention will be described with reference to FIGS. 1 and 2.

In a study of diagnosis methods of operational conditions of an LM system of the type mentioned above, the inventor of the present invention discovered that a so-called AE phenomenon, which is conventionally utilized for failure diagnostics and the like of rolling ball bearing apparatuses, could also be utilized for the diagnosis of operational conditions of the LM system.

More specifically, the inventor of the present invention experimentally-validated that different forms of AE phenomena occur for respective abnormal operational conditions that occur in an LM system (more specifically, such abnormal operational conditions as used hereinafter shall include: a condition of insufficient lubrication; a condition in which a crack [as used hereinafter, such cracks shall include both superficial and internal cracks] has occurred; or a condition of insufficient lubrication caused by contamination of a liquid other than the lubricant), and that mutually different AE waves are generated in the event that different abnormal operational conditions occur. As used herein, a "condition of insufficient lubrication" either refers to a condition in which either a lubricant itself is insufficient or a condition in which the characteristics of the lubricant has deteriorated. In addition, "flaking" refers to a phenomenon in which the surface of a ball as a rolling member included in an LM system, a guide surface as a rolling surface with which the ball comes into contact or the like, flakes off, while "liquids other than the lubricant" refers to a coolant or the like used in, for instance, a cutting apparatus utilizing the LM system according to the present invention.

Conventionally, such AE phenomena were defined as either "phenomena in which elastic energy is released and acoustic waves (AE waves) are generated as destruction or deformation of a solid material occurs" or "phenomena in which elastic waves are released accompanying plastic deformation, crack generation or the like inside a material". However, the inventor of the present invention has verified that, in addition to the above, AE waves similarly occur in a case in which no plastic deformations or cracks have occurred on the surface of the balls or the guide surface but a crack has occurred inside the balls or the guide, or simply due to collisions between balls or collisions between the balls and the guide under normal operations of the LM system.

More specifically, as shown in FIG. 1 (a) in regards to a case of an LM system using a movable block, occurrences of AE waves have been respectively verified in a case in which self-rotating balls B revolve within a rolling path formed in a movable block C when: the balls B collide with each other at a contact area $R_1$; the balls B, under an unloaded condition, collide with the movable block C at a contact area $R_2$; the balls B, under a loaded condition, collide with the movable block C at a contact area $R_3$; the balls B, under an unloaded condition, collide with a rolling surface G at a contact area $R_4$; or when the balls B, under a loaded condition, collide with the rolling surface G at a contact area $R_5$. In addition, as shown in FIG. 1 (b) in regards to a case of an LM system using a movable block, even in a case in which a so-called retainer TR is provided in the rolling path in addition to the balls B, occurrences of AE waves have been respectively verified in a case in which self-rotating balls B revolve within a rolling path formed in a movable block C when: the balls B, under an unloaded condition, collide with the movable block C at a contact area $R_6$; the balls B, under a loaded condition, collides with the movable block C at a contact area $R_7$; the balls B, under an unloaded condition, collide with a rolling surface G at a contact area $R_8$; or when the balls B, under a loaded condition, collide with the rolling surface G at a contact area $R_9$.

Furthermore, the inventor has discovered that the generation modes of such AE waves were mutually different in accordance with the above-described types of abnormal operational conditions.

Moreover, as described above, since the present invention is premised on the occurrence of AE phenomena in a scope that is wider than that conventionally defined, AE phenomena that are particularly applied to the present invention shall be referred to as extended AE phenomena, and generated AE waves attributable to such extended AE phenomena shall be referred to as extended AE waves.

Since electric signals corresponding to extended AE waves have frequencies that are higher than vibrations that generally occur during operations of the LM system, for instance, as shown in FIG. 1(c), such electric signals may now be separated from the vibrations to be detected by means of a band-pass filter shown in FIG. 3 and described later. As a result, operational conditions of the LM system may now be detected on a real-time-basis during operations thereof.

In addition, regarding the detection of operational conditions, the inventor of the present invention has discovered that specific contents of operational conditions of the LM system may be identified at higher accuracy and reliability by using three parameters $P_1$ to $P_3$, which will be described below, in combination with electric signals corresponding to extended AE waves separated by means of the above-described envelope detection method.

More specifically, first, a single measurement data group is configured as a detection data group containing N number of measurement data corresponding to a given measurement period, using each measurement data obtained by sampling the above-mentioned electric signals as respective detection data. Then, using the value of each measurement data respectively included in the measurement data groups, three parameters $P_1$ to $P_3$, as shown below, are obtained for each measurement data group. In the following formulas, $X_i$ denotes a value of each measurement data, N denotes a total number of measurement data, K (constant) denotes a maximum input range at an envelope detection section 2B to be described later (FIG. 3), and M denotes a number of measurement data, among the measurement data, that is actually extracted to be used to create parameters.

$$P_1 = \sqrt{\frac{1}{N}\sum_{i=1}^{N}(X_i)^2} \qquad \text{[Formula 31]}$$

$$P_2 = \frac{1}{\sqrt{\frac{1}{N}\sum_{i=1}^{N}(K-X_i)^2}} \qquad \text{[Formula 32]}$$

$$P_3 = \frac{\sqrt{\frac{1}{M}\sum_{j=1}^{M}(X_j)^2}}{P_1} \qquad \text{[Formula 33]}$$

Among each parameter $P_1$ to $P_3$ obtained in this manner, a parameter P1 that is below a first threshold $TH_1$ experimentally obtained in advance indicates that only a small number of extended AE waves have been generated. Therefore, the LM system may be judged to be in a normal operational state.

It has been further experimentally-validated that, in the event that N number of measurement data corresponding to a given measurement period is arranged as a single measurement data group, and using values of parameters $P_2$ and $P_3$ obtained for each measurement data group, each measurement data group is plotted as a single point onto a graph in which the horizontal axis is the values of the parameter $P_2$ and the vertical axis is values of the parameter $P_3$: points converge in an area $A_2$ shown in FIG. 2 when the operational condition of the LM system is normal; points converge in an area $A_4$ shown in FIG. 2 when the operational condition is the above-described condition of insufficient lubrication; points converge in an area $A_3$ shown in FIG. 2 when the operational condition is the above-described condition of insufficient lubrication caused by contamination by a liquid other than the lubricant; and points converge in an area $A_1$ shown in FIG. 2 when the operational condition is the above-described condition of crack occurrence.

In consideration of the above, the inventor of the present invention has arranged automatic detection to be performed on even specific contents of the operational conditions of the LM system by experimentally setting boundary values for determining operational conditions for each of the three above-described parameters as first threshold $TH_1$ to third threshold $TH_3$, and computing the relationship between the thresholds and each parameter $P_1$ to $P_3$ (First Embodiment).

In addition, the inventor of the present invention has arranged a user of the LM system to judge even specific contents of operational conditions of the LM system based on a diagnostic map, to be described later, which is displayed by first experimentally setting a boundary value for determining operational conditions for the above-described parameter $P_1$ as a first threshold $TH_1$, and computing the relationship between the threshold and the parameter $P_1$, and at the same time respectively displaying the graph (in which the horizontal axis is the values of the parameter $P_2$ and the vertical axis is the values of the parameter $P_3$) shown in FIG. 2 for the second parameter $P_2$ and the third parameter $P_3$ (Second Embodiment).

(II) First Embodiment

A first embodiment of the present invention, based on the above-described principle, will be specifically described with reference to FIGS. 3 to 8.

Figure 4:
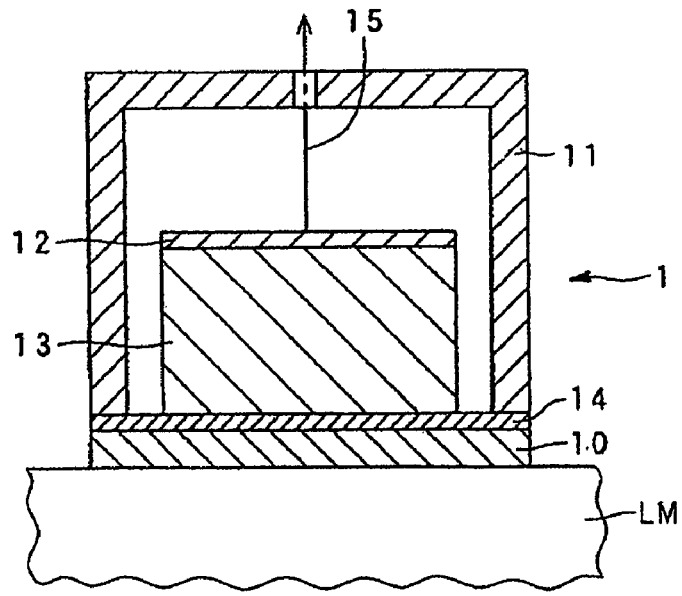
FIG. 4 is a longitudinal sectional view showing a configuration of an AE sensor according to the first and second embodiments.
Figure 5:
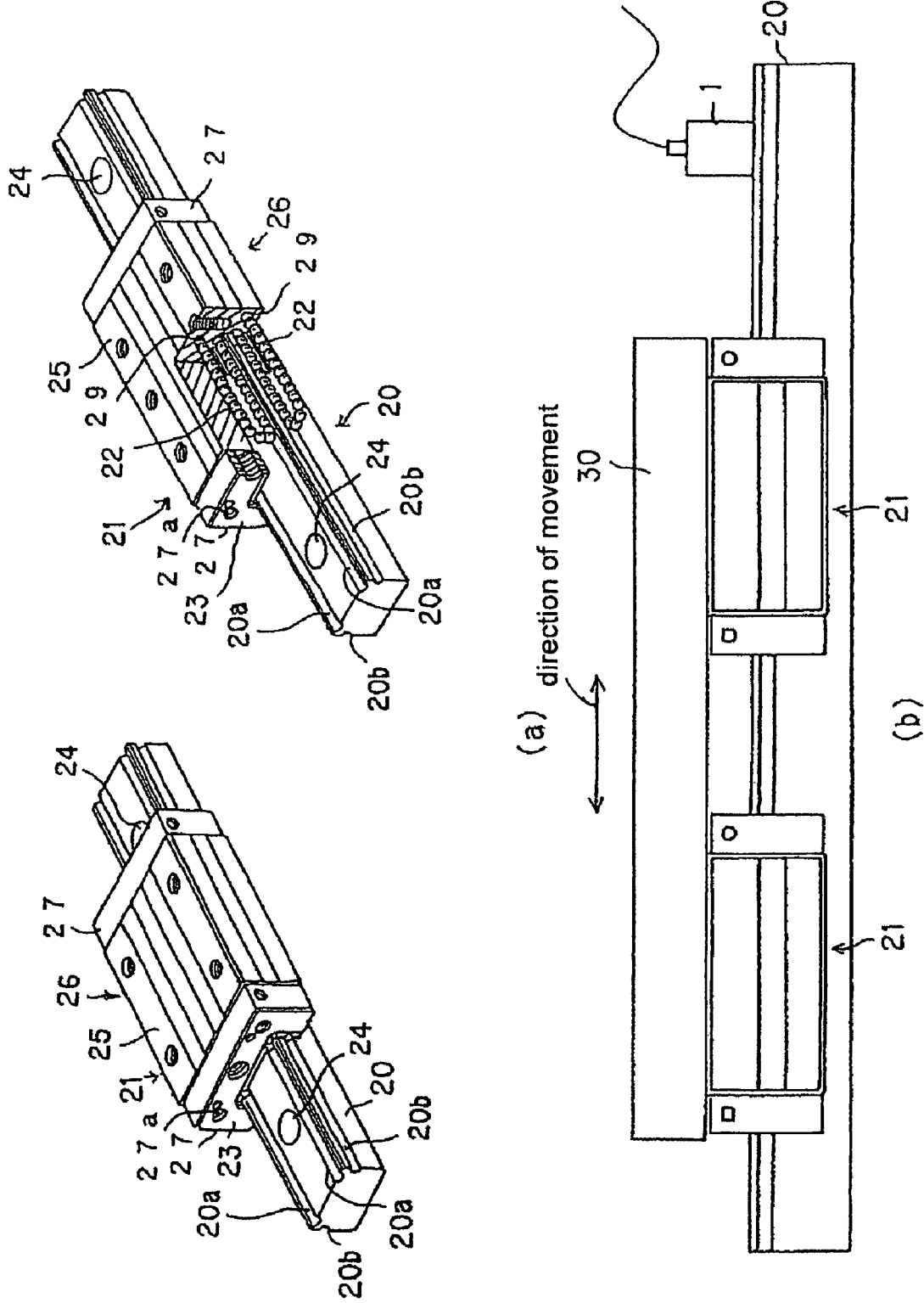
FIG. 5 is a figure (I) showing an installation mode of the AE sensor according to the first and second embodiments of the present invention, in which (a) is a perspective view of a structure of an LM system including a movable block, and (b) is an external side view showing an example of a position in a case in which the AE sensor is set to the LM system.
Figure 6:
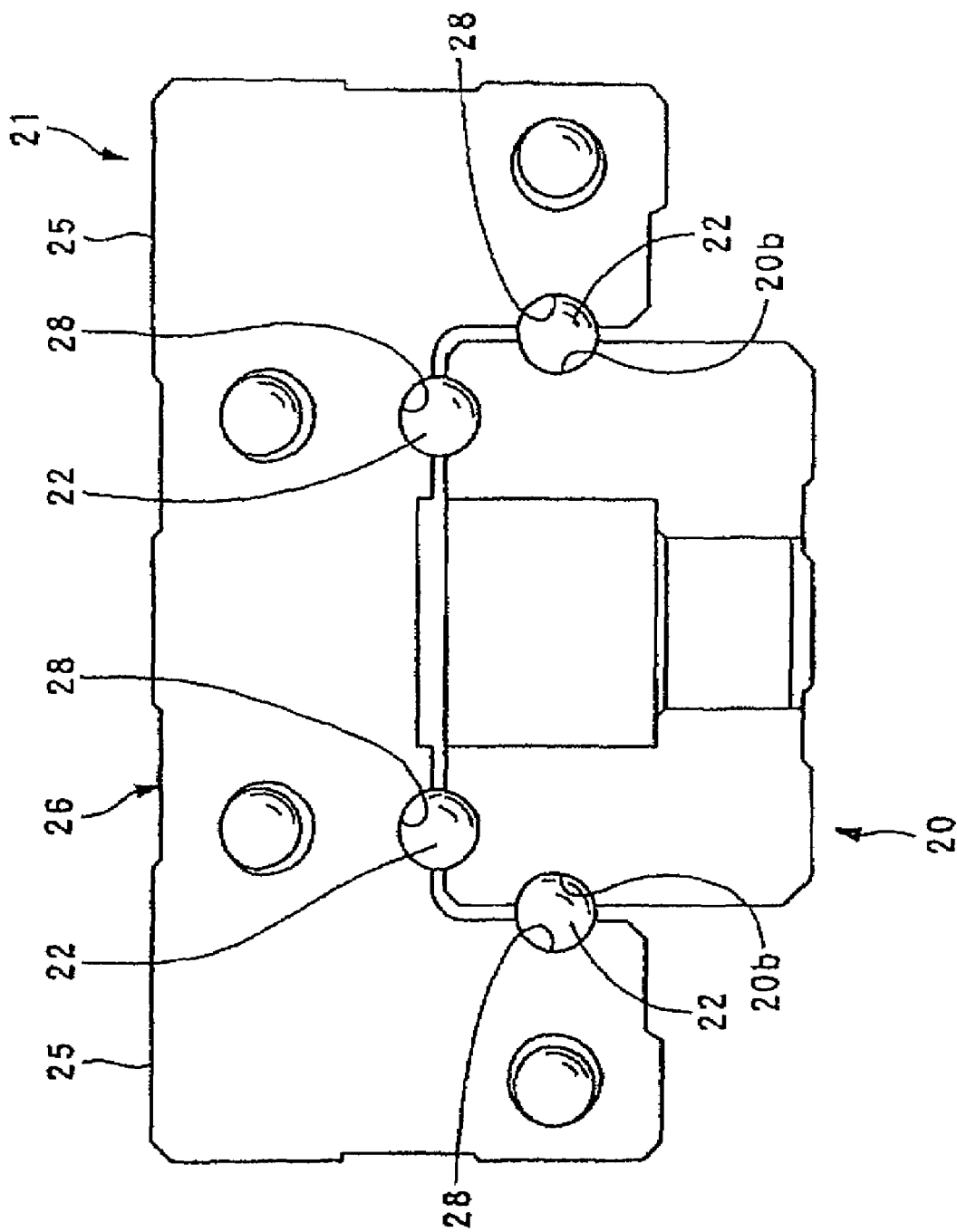
FIG. 6 is a side view showing an LM system including a moving block according to the first and second embodiments.
Figure 7:
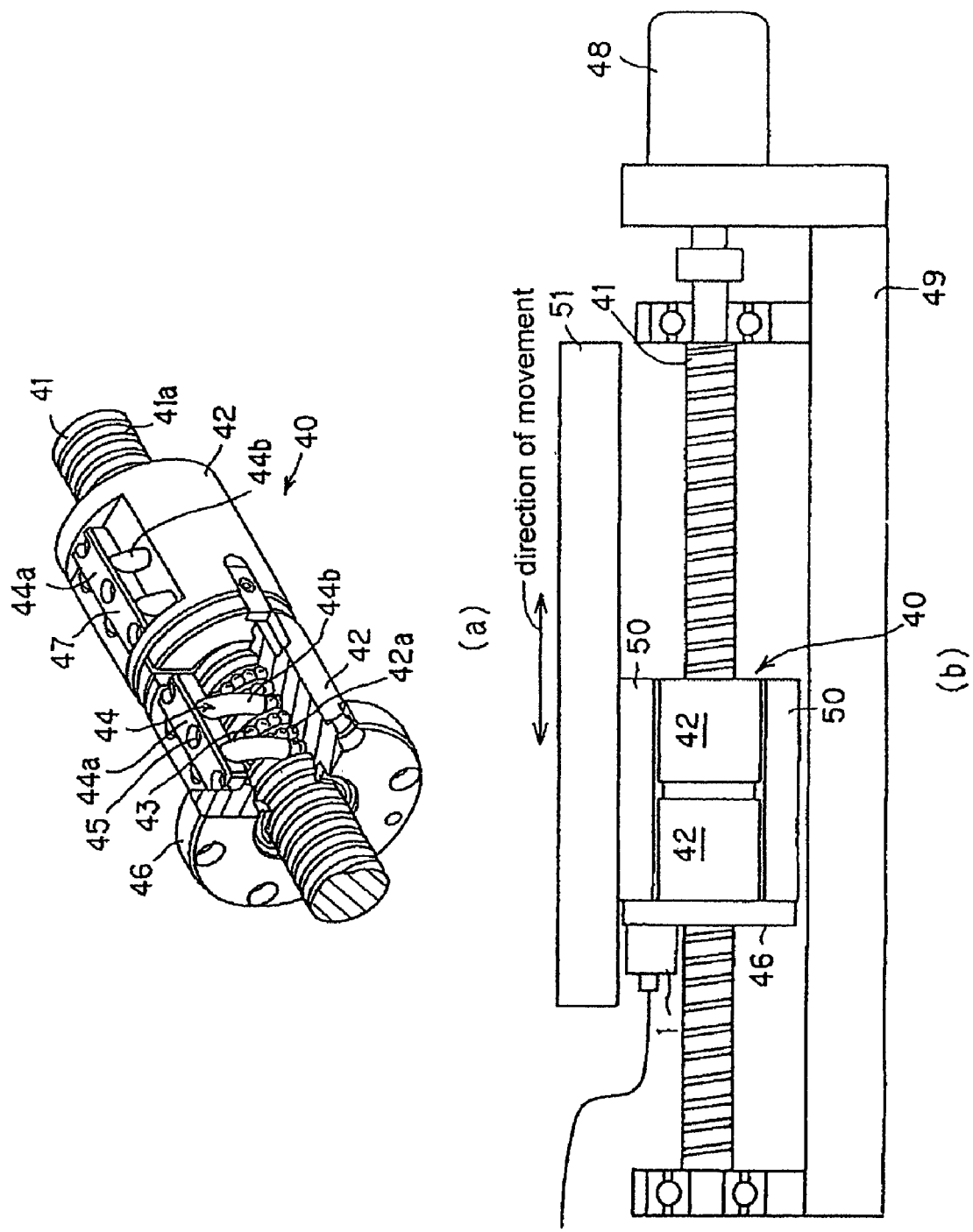
FIG. 7 is a figure (II) showing an installation mode of the AE sensor according to the first and second embodiments of the present invention, in which (a) is a perspective view of a structure of an LM system including a ball screw, and (b) is an external side view showing an example of a position in a case in which the AE sensor is set to the LM system.
Figure 8:
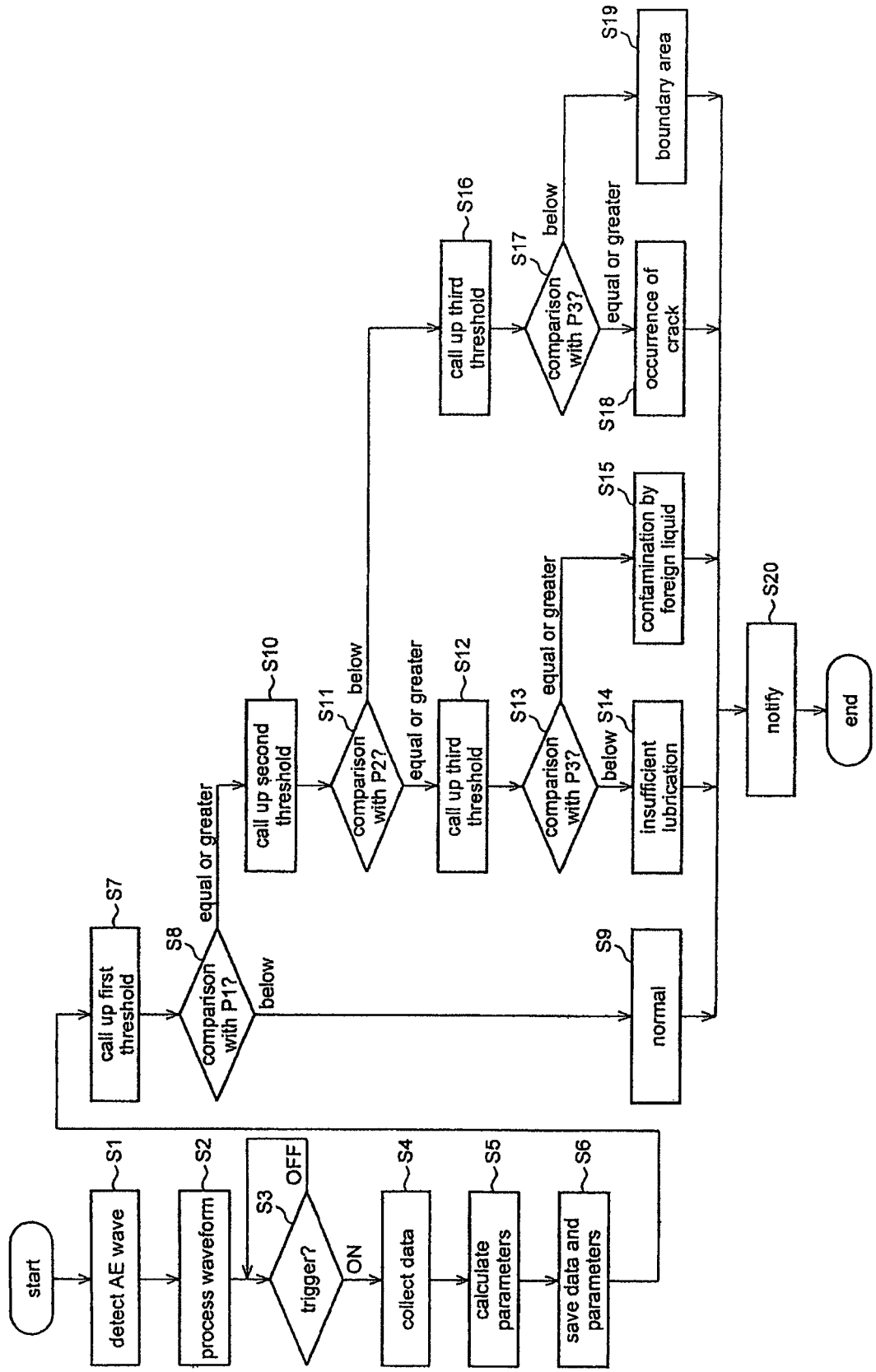
FIG. 8 is a flowchart showing operational condition detection processing according to the first embodiment.

In the drawings: FIG. 3 is a block diagram showing a general structure of a condition diagnosis apparatus according to the first embodiment; FIG. 4 is an longitudinal sectional view showing a general structure of an AE sensor that detects extended AE waves according to the first embodiment; FIGS. 5 to 7 are views for describing an LM system to which the present invention is applied; and FIG. 8 shows a flowchart representing an operational condition detection processing executed by the condition diagnosis apparatus according to the first embodiment.

Figure 3:
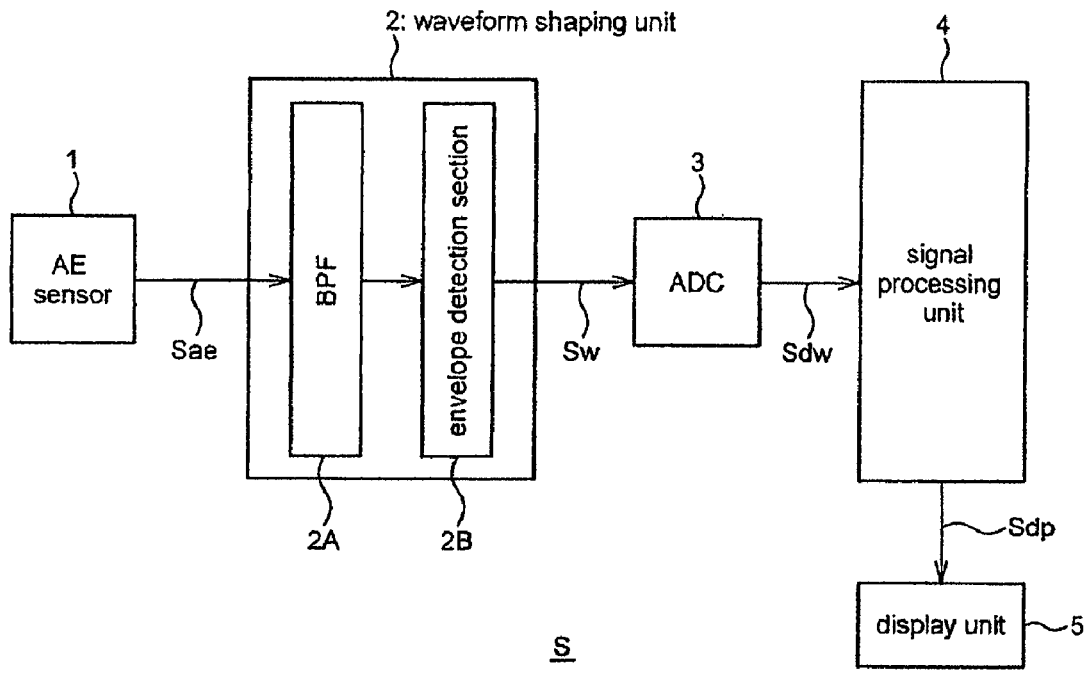
FIG. 3 is a block diagram showing a configuration of a condition detection apparatus according to the first and second embodiments.

As shown in FIG. 3, a condition diagnosis apparatus S according to the first embodiment comprises: an AE sensor 1; a waveform shaping unit 2 including a BPF (Band Pass Filter) 2A and an envelope detection section 2B; an A/D (Analog-to-Digital) converter 3; a signal processing unit 4 that functions as a first generation device, a second generation device, a third generation device and a judgment device; and a display unit 5 including a liquid crystal display and the like, which functions as a notification device.

Next, operations will be described.

First, the AE sensor 1 is disposed at an arbitrary position of the LM system that is an diagnostic object, such as an end position of a rail, a position on a movable block as a movable member or the like, and is further arranged so that a contact section, to be described later (FIG. 4), comes into contact with any of the above-mentioned positions. The AE sensor 1 detects extended AE waves generated by operations of the LM system, converts the detected extended AE waves into a detection signal Sae as an analog signal, and outputs the converted signal to the waveform shaping unit 2.

Next, after the detection signal Sae is amplified at an amplification section, not shown, by a required amplification factor (more specifically, i.e. around 40 decibels to 60 decibels), the BPF 2A in the waveform shaping unit 2 removes frequency components of the amplified detection signal Sae other than those of the extended AE wave, and outputs the signal Sae to the envelope detection section 2B. Herein, as a specific example of a pass frequency range at the BPF 2A with respect to the detection signal Sae, a BPF that passes frequency components that are, for instance, equal to or greater than 100 kHz and equal to or less than 1 MHz is desirably used as the BPF 2A.

The envelope detection section 2B extracts envelope component processing with respect to the detection signal Sae and creates an envelope signal Sw, which is then sent to the A/D converter 3.

Next, the A/D converter 3 digitalizes the envelope signal Sw that is an analog signal and creates a digital envelope signal Sdw, which is then sent to the signal processing unit 4.

The signal processing unit 4 judges the present operational condition of the LM system that is the diagnostic object by means of the operation condition detection processing shown in FIG. 8, described hereinafter, based on the digital envelope signal Sdw, and creates a judgment signal Sdp that represents the results of the judgment, which is then outputted to the display unit 5.

Accordingly, the display unit 5 displays contents of the judgment based on the judgment signal Sdp. This allows a user of the LM system to keep track of operational conditions thereof.

Next, the structure of the AE sensor 1 and modes for installing the same to the LM system as a diagnostic object will be described with reference to FIGS. 4 to 7.

An internal structure of the AE sensor 1 will be first described with reference to FIG. 4.

As shown in FIG. 4, the AE sensor 1 has a generally cylindrical shape, and more specifically, is composed of: a contact section 10 arranged so as to contact a rail LM or the like in the LM system; a chassis 11; a piezoelectric element 13; evaporated silver films 12 and 14 deposited on upper and lower surfaces of the piezoelectric element 13; and an external line 15 that conducts the above-described detection signal Sae and outputs the same to the waveform shaping unit 2.

When an extended AE wave generated inside the LM system is transferred to the piezoelectric element 13 via the contact portion 10 and the silver thin film 14, the shape of the piezoelectric element 13 is minutely deformed by the extended AE wave. This causes an electric potential difference between the silver thin films 12 and 14, thereby generating the above-described detection signal Sae on the external line 15.

Next, modes for installing the AE sensor 1 provided with the internal structure shown in FIG. 4 to the LM system will be described with reference to FIGS. 5 to 7. FIGS. 5 and 6 are diagrams representing modes in a case in which the AE sensor 1 is installed to an LM system using the movable block as the diagnostic object LM system, while FIG. 7 is a diagram representing a mode in a case in which the AE sensor 1 is installed to an LM system using a so-called ball screw as the diagnostic object LM system.

First, the case in which the AE sensor 1 is mounted to the LM sensor utilizing the movable block will be described with reference to FIGS. 5 and 6.

The LM system shown in FIG. 5(a) is composed of: a rail 20 provided with ball rolling grooves 20a and 20b along which balls 22, to be described later, roll in a longitudinal direction; a movable block 21 engaged with the rail 20 via a number of balls 22 and provided therein with an endless circulation passage of the balls 22; and seal members 23 applied to both end surfaces of the movable block 21 in its direction of movement and seal the upper and both side surfaces of the rail 20, wherein the LM system is arranged so that the movable block 21 reciprocally moves on the rail 20 according to the circulation of the balls 22.

As shown in these figures, the cross-section of the rail 20 has a substantially rectangular shape, and is formed with attachment holes 24, for inserting fastening bolts, across the longitudinal direction of the rail 20 at appropriate intervals. In addition, two rows of ball rolling grooves 20a are formed on the upper surface of the rail 20 so as to sandwich the attachment holes 24 therebetween, and two rows of ball rolling grooves 20b are further formed on the respective side surfaces of the rail 20. These four rows of ball rolling grooves are formed with a curvature slightly larger than the curvature of the spherical surface of the balls 22 so as to provide a deep groove configuration.

On the other hand, the movable block 21 is composed of: a movable block main body 26 provided with a mount surface 25 to which a movable member such as table 30, to be described hereinafter, is mounted; and a pair of end plates 27 fixed to both longitudinal end surface portions of the movable block main body 26. The movable block 21 has a straddle-shaped cross section, and a lower side of the movable block 21 is provided with a depressed section into which an upper portion of the rail 20 is loosely fitted.

More specifically, as shown in FIG. 6, the movable block main body 26 has a pair of skirt sections extending downward from a base, on which the mount surface 25 is formed, and both end portions of the base so as to provide a saddle-shaped cross section. Four rows of loaded rolling grooves 28 are formed to the inside surface of each skirt portion as well as the lower surface of the base so as to respectively oppose the ball rolling grooves 20a and 20b of the rail 20. The balls 22 roll between the loaded rolling grooves 28 and the ball rolling grooves 20a and 20b of the rail 20 while being loaded, thereby moving the movable block 21 on the rail 20.

Returning now to FIG. 5(a), the base and the respective skirt portions of the moving block main body 26 are drilled with ball return bores 29 respectively corresponding to the loaded rolling grooves 28. These ball return bores 29 are respectively coupled and communicated with the loaded rolling grooves 28 by redirection passages (not shown), having substantially U-shapes, formed on the end plates 27. In other words, the redirection passages scoop up balls 22 which have finished rolling on the loaded rolling grooves 28 of the movable block main body 26, and feed the balls 22 to the ball return bores 29. On the other hand, the redirection passages are arranged to feed out the balls 22 from the ball return bores 29 to the loaded rolling grooves 28. Accordingly, by fastening the end plates 27 to the movable block main body 26 by means of fastening bolts 27a, an endless circulation passage of the balls 22 is formed on the movable block 21.

Further, when the AE sensor 1 according to the first embodiment is set to the LM system shown in FIG. 5(a), for instance, as shown in FIG. 5(b) as an external side view, in a case in which the table 30 is set on a plurality of movable blocks 21 that linearly move on the track rail 20, the AE sensor 1 will be placed on a position of the rail 20 that is outside the moving range of the movable block 21.

Next, a case in which the AE sensor 1 is set to the LM system utilizing a ball screw will be described with reference to FIG. 7.

As shown in FIG. 7(a), a ball screw 40 is provided with: a screw shaft 41 having an outer peripheral surface on which a spiral ball rolling groove 41a is formed; a nut member 42 having an inner peripheral surface in which a spiral loaded rolling groove 42a is formed so as to oppose the spiral ball rolling groove 41a; and balls 43 that roll between the ball rolling groove 41a and the loaded rolling groove 42a. A loaded rolling passage is formed by and between the ball rolling groove 41a of the screw shaft 41 and the loaded rolling groove 42a of the nut member 42. The nut member 42 is mounted with, for instance, two return pipes 44 as circulation members. The return pipes 44 connect one end of the loaded rolling passage to the other end thereof so as to configure a non-loaded return passage. The return pipes 44 are formed in substantially gate-shapes, and are provided with central portions 44a and a pair of leg portions 44b on both sides of the central portions 44a. The paired leg portions 44b are inserted into the loaded rolling passage at an interval of several pitches. The return pipes 44 are fixed to the nut member 42 by a coupling device such as bolts 45.

The spiral ball rolling groove 41a, having a semi-circular cross section and provided with a spiral constant lead on an outer peripheral surface thereof, is formed on the screw shaft 41 through a grinding process, rolling process or the like. The nut member 42 has substantially a cylindrical shape and is provided with a flange 46 at an end face thereof for mounting the ball screw 40 to a machine or the like. The loaded rolling groove 42a has a semi-circular sectional shape, and is formed to the inner peripheral surface of the nut member 42 so as to oppose the ball rolling groove 41a of the screw shaft 41. The nut member 42 is provided with a partial flat surface portion 47 on an upper surface thereof. A plurality of return pipe fitting holes, into which the leg portions 44b of the return pipes 44 are inserted, are formed on the flat surface portion 47.

When the AE sensor 1 of the first embodiment is set to the LM system shown in FIG. 7(a), in a case in which a table 51 is fixed via a bracket 50 to the ball screw 51, at which the screw shaft 41 rotatably supported by, for example, a table 49, is rotated by a motor 48, the AE sensor 1 will be mounted onto a surface of the flange 46 perpendicular to the central axis of the ball screw 40.

Next, operating condition detection processing according to the first embodiment, which is primarily executed by the signal processing unit 4, will be explained with reference to FIGS. 1 to 3 and FIG. 8.

As shown in FIG. 8, in a case in which operating condition detection processing according to the first embodiment is executed during the operation of the diagnostic object LM system, processing of necessary initial settings and the like is first carried out. Next, an extended AE wave generated in accordance with an extended AE phenomenon during operations of the LM system is detected by the AE sensor 1 (step S1), processing such as waveform shaping and the like is performed on a detection signal Sae corresponding to the to the detected extended AE wave at the waveform shaping unit 2 (step S2), and an envelope signal Sw is created and outputted as a digital envelope signal Sdw via the A/D converter 3 to the signal processing unit 4.

Then, confirmation is made on whether a trigger signal corresponding to a timing preset as a timing for acquiring the above-mentioned measurement data (for instance, in the case of the LM system shown in FIG. 5, a timing at which the movable block 21 comes close to one end section of the rail 20) has been generated within the signal processing unit 4 (step S3), and the digital envelope signal Sdw is retrieved as the measurement data at the timing at which the trigger signal has been generated (step S3; ON).

Subsequently, extended AE wave detection processing (step S1), waveform shaping processing (step S2) and processing of acquisition as measurement data (step S3) are repeated over a required inspection period to accumulate measurement data as the digital envelope signal Sdw into a memory, not shown, within the signal processing unit 4 (step S4). Then, parameters $P_1$ to $P_3$, to be used for performing each judgment hereinafter described, are calculated based on each corresponding formula and based on the accumulated measurement data, and are accumulated in the above-mentioned memory (steps S5, S6).

Once calculation of each parameter $P_1$ to $P_3$ as well as accumulation thereof are completed, the signal processing unit 4 then reads out a first threshold $TH_1$ that is experimentally set in advance in correspondence to the parameter $P_1$ and stored in the memory as a criterion of judgment for judging whether the LM system according to the first embodiment is operating normally (step S7), and compares the read-out first threshold $TH_1$ with the value of the parameter $P_1$ that is stored at that time (step S8).

If the value of the parameter $P_1$ is below the first threshold $TH_1$ (step S8; below), the operational condition of the LM system at that time is judged to be normal (step S9), the normal condition is displayed using the display unit 5 (step S20), and the series of operating condition detection processing is thereby concluded.

On the other hand, if it is judged in step S8 that the value of the parameter $P_1$ is equal to or greater than the first threshold $TH_1$ (step S8; equal or greater), a second threshold $TH_2$ (for instance, a value of the parameter $P_2$ indicated by the reference character $TH_2$ in FIG. 2 may be used as a value of this second threshold $TH_2$) that is experimentally set in advance in correspondence to the parameter $P_2$ and the respective areas shown in FIG. 2 and stored in the memory as a criterion of judgment for judging whether the operational condition of the LM system is abnormal, is read out from the memory (step S10), and the read-out second threshold $TH_2$ is compared with the value of the parameter $P_2$ that is stored at that time (step S11).

If the value of the parameter $P_2$ is equal to or greater than the second threshold $TH_2$ (step S11; equal or greater), the operational condition of the LM system at that time is judged to be some kind of an abnormal condition. Next, a third threshold $TH_3$ (for instance, a value of the parameter $P_3$ indicated by the reference character $TH_3$ in FIG. 2 may be used as a value of this third threshold $TH_3$) that is experimentally set in advance to respectively correspond to the parameter $P_3$ and the areas $A_1$, $A_3$ and $A_4$ shown in FIG. 2 and stored in the memory as a criterion of judgment for judging specific contents of an abnormal operational condition (in other words, either a condition of insufficient lubrication, a condition of contamination by a liquid other than the lubricant, or a condition in which a crack has occurred) of the LM system, is read out from the memory (step S12), and the read-out third threshold $TH_3$ is compared with the value of the parameter $P_3$ that is stored at that time (step S13).

If the value of the parameter $P_3$ is below the third threshold $TH_3$ (step S13; below), the operational condition of the LM system at that time is judged to be a condition of insufficient lubrication (step S14), the condition is displayed using the display unit 5 (step S20), and the series of operating condition detection processing is thereby concluded.

In addition, if it is judged in step S13 that the value of the parameter $P_3$ is equal to or greater than the third threshold $TH_3$ (step S13; equal or greater), the operational condition of the LM system at that time is judged to be a condition in which contamination by a liquid other than the lubricant has occurred (step S15), the condition is displayed using the display unit 5 (step S20), and the series of operating condition detection processing is thereby concluded.

On the other hand, if it is judged in step S11 that the value of the parameter $P_2$ is below the second threshold $TH_2$ (step S11; below), the third threshold $TH_3$ is next read out from the memory (step S16), and the read-out third threshold $TH_3$ is compared with the value of the parameter $P_3$ that is stored at that time (step S17).

If the value of the parameter $P_3$ is below the third threshold $TH_3$ (step S17; below), the operational condition of the LM system at that time is judged to be either normal or a condition of insufficient lubrication (or otherwise in a boundary area thereof) (step S19), the condition is displayed using the display unit 5 (step S20), and the series of operating condition detection processing is thereby concluded.

In addition, if it is judged in step S17 that the value of the parameter $P_3$ is equal to or greater than the third threshold $TH_3$ (step S17; equal or greater), the operational condition of the LM system at that time is judged to be a condition in which a crack has occurred in any of its members (step S18), the condition is displayed using the display unit 5 (step S20), and the series of operating condition detection processing is thereby concluded.

By displaying as well as accumulating the results of the above-described series of operational condition detection in the memory in the signal processing unit 4 to be statistically processed, deterioration of operational conditions may be detected and occurrences of malfunctions may be prevented.

As described, since extended AE waves that occur due to operations of the LM system are detected to generate the above-mentioned parameter $P_1$, and the operational condition of the LM system is judged to be normal when the value of the parameter $P_1$ is below the first threshold $TH_1$, operations of the condition diagnosis apparatus S according to the first embodiment enable real-time detection of whether the operational condition of the LM system is normal to be performed during operations thereof without having to dismantle the LM system and while eliminating the influences of vibration attributable to operations thereof.

Therefore, prognosis of occurrences of failures in the LM system may now be performed, thus improving the maneuverability for a user of the LM system and elongating the usable life time thereof and improving the quality of devices or machineries manufactured by utilizing this LM system.

In addition, since contents of operational conditions are judged using the parameter $P_2$ or the parameter $P_3$ in the event that the value of the parameter $P_1$ is equal to or greater than the first threshold $TH_1$, judgment and detection of even specific contents of operational conditions may be performed more precisely.

Furthermore, since the parameter $P_1$ is a parameter given by $$P_1 = \sqrt{\frac{1}{N}\sum_{i=1}^{N}(X_i)^2}, \qquad \text{[Formula 34]}$$

the parameter $P_2$ is a parameter given by $$P_2 = \frac{1}{\sqrt{\frac{1}{N}\sum_{i=1}^{N}(K - X_i)^2}}, \qquad \text{[Formula 35]}$$

and the parameter $P_3$ is a parameter given by $$P_3 = \frac{\sqrt{\frac{1}{M}\sum_{j=1}^{M}(X_j)^2}}{P_1} \quad \text{[Formula 36]}$$

detection of specific contents of operational conditions may be performed more precisely.

Moreover, since the operational condition of the LM system is judged to be a condition of insufficient lubrication when the value of the parameter $P_1$ is equal to or greater than the first threshold $TH_1$, the value of the parameter $P_2$ is equal to or greater than the second threshold $TH_2$ and the value of the parameter $P_3$ is below the third threshold $TH_3$, real-time detection of whether the operational condition is a condition of insufficient lubrication may be performed during operations of the LM system without having to dismantle the LM system and while eliminating the influences of vibration attributable to operations thereof.

Additionally, since the operational condition of the LM system is judged to be a condition in which contamination by a liquid other than the lubricant has occurred when the value of the parameter $P_1$ is equal to or greater than the first threshold $TH_1$, the value of the parameter $P_2$ is equal to or greater than the second threshold $TH_2$ and the value of the parameter $P_3$ is equal to or greater than the third threshold $TH_3$, real-time detection of whether the operational condition is a condition in which contamination by a liquid other than the lubricant has occurred may be performed during operations of the LM system without having to dismantle the LM system and while eliminating the influences of vibration attributable to operations thereof.

Furthermore, since the operational condition of the LM system is judged to be a condition in which a crack has occurred at, for instance, at least any of the rail 20 or the balls 22 when the value of the parameter $P_1$ is equal to or greater than the first threshold $TH_1$, the value of the parameter $P_2$ is below the second threshold $TH_2$ and the value of the parameter $P_3$ is equal to or greater than the third threshold $TH_3$, real-time detection of whether the operational condition is a condition in which a crack has occurred at, for instance, at least any of the rail 20 or the balls 22 may be performed during operations of the LM system without having to dismantle the LM system and while eliminating the influences of vibration attributable to operations thereof.

Moreover, since the respective judgment results described above are displayed by the display unit 5 to notify the user, the user of the LM system may readily acknowledge specific contents of operational conditions of the LM system.

Incidentally, by recording a program corresponding to the flowchart shown in FIG. 8 to an information recording medium such as flexible disk or a hard disk and the like, or otherwise recording a program obtained via a network such as the Internet or the like, and reading out and subsequently executing the program by a general-purpose micro-computer, such a micro-computer may be enabled to function as the signal processing unit 4 according to the first embodiment. In this case, the above-described AE sensor 1, the waveform shaping unit 2 and the A/D converter 3 will be configured as an external apparatus to the micro-computer.

Additionally, regarding the respective parameters $P_1$ to $P_3$, for instance, values represented by $$P_1 = \frac{1}{N}\sum_{i=1}^{N} X_i \text{ (arithmetic average)} \quad \text{[Formula 37]}$$

or $$P_3 = \frac{\sqrt{\frac{1}{N}\sum_{i=1}^{N}(X_i)^2}}{\frac{1}{N}\sum_{i=1}^{N} X_i} \quad \text{[Formula 38]}$$

may be respectively used in addition to the values described above.

Furthermore, the parameter $P_1$ may be any statistic that indicates the measure of extended AE waves.

Moreover, the parameter $P_2$ may be any parameter as long as such a parameter performs weighting on components of an extended AE wave that are temporally-continuously detected, and changes in correspondence to changes in such components.

In addition, the parameter $P_3$ may be any parameter as long as such a parameter performs weighting on components of an extended AE wave that are temporally-discontinuously detected with regards to the movement of the balls B, and changes in correspondence to changes in such components. Here, in contrast to the parameter $P_2$ that performs weighting on components which are "temporally-continuously" detected, the definition of the term "temporally-discontinuous" that is used in relation to the parameter $P_3$ includes other cases that are temporally-discontinuous or, in other words, cases in which, for instance, extended AE waves are intermittently detected at a certain cycle, and cases in which extended AE waves are randomly detected without any periodicity or the like.

As described above, in a case in which the parameter $P_2$ is defined as a parameter that changes in correspondence to changes in components of an extended AE wave that are temporally-continuously detected, and the parameter $P_3$ is further defined as a parameter that changes in correspondence to changes in components that are temporally-discontinuously detected primarily in correspondence with the movement of the balls B, a configuration is possible in which a lowpass filter, having a cutoff frequency that is lower than the detected frequency of components that are temporally-discontinuously detected in correspondence with the movement of the balls B, is used to extract components that are temporally-continuously detected, and a highpass filter having the same cutoff frequency is further used to extract components that are temporally-discontinuously detected. In this case, a condition diagnosis apparatus similar to the condition diagnosis apparatus S according to the first embodiment may be achieved with a simpler configuration without having to use a circuit for envelope detection shown in FIG. 3.

Furthermore, in the above-mentioned first embodiment, the condition detection apparatus S shown in FIG. 3 is configured as a single apparatus. More specifically, the first embodiment is applied to a case in which the condition diagnosis apparatus S is carried to a factory or the like, at which a diagnostic object LM system is installed and used, to perform on-site detection and diagnostics of the operational condition of the LM system.

Moreover, in addition to the above-described mode, the condition detection apparatus S according to the first embodiment may be applied to a case in which the condition diagnosis apparatus S is permanently placed at a factory or the like at which a diagnostic object LM system is installed and used, and detection and diagnostics of the operational condition of the LM system is performed by a diagnostic personnel from an isolated location by remotely controlling the condition diagnosing apparatus S via a telephone line or the like.

Additionally, the present invention may be applied to a case in which: the condition diagnosis apparatus S is permanently placed at a factory or the like at which a diagnostic object LM system is installed and used; detection and diagnostics of the operational condition of the LM system is automatically performed by the condition diagnosis apparatus S while concurrently transferring the detection results to another location to be accumulated; and accumulative fault diagnostics is performed based on the accumulated detection results.

Furthermore, in the above-described first embodiment, although a description has been provided on configuring the condition detection apparatus S so that one waveform shaping unit 2, one A/D converter 3, one signal processing unit 4 and one display unit 5 are respectively utilized for one AE sensor 1, the condition detection apparatus S may be alternatively configured so that the detection signals Sae from a plurality of AE sensors 1 are inputted via a switching circuit into one waveform shaping unit 2, and the detection signals Sae from a plurality of AE sensors 1 are processed by respectively utilizing one waveform shaping unit 2, one A/D converter 3, one signal processing unit 4 and one display unit 5. In this case, it will be necessary to synchronize the execution timing of the detection processing utilizing the waveform shaping unit 2, the A/D converter 3, the signal processing unit 4 and the display unit 5 with the retrieval timing of the detection signal Sae from the corresponding AE sensor 1.

FIRST EXAMPLE

Next, in order to demonstrate the effectiveness of the above-described principle of the present invention as well as the condition detection apparatus S according to the first embodiment, an example in which a group of actual measurement data is plotted using the graph shown in FIG. 2 will be described with reference to FIGS. 9 and 10.

As for the experimental environment in which the respective points indicated below were obtained, in the case of FIG. 9, a model SNS55LR manufactured by the present applicant was used as an LM guide to which the AE sensor 1 is set. External load to the movable block was set to 0.09 C (14.7 kN), the stroke or movement distance of the movable block was set to 250 mm, movement speed of the same was set to 400 mm/sec, the sampling rate of the detection signal Sae was set to 10 kilohertz, and a measurement period of 0.4 seconds was used.

Additionally, in the case of FIG. 10, a model SHS25V manufactured by the present applicant was used as an LM guide to which the AE sensor 1 is set. External load to the movable block was set to 0.7 C (22.2 kN), the stroke or movement distance of the movable block was set to 350 mm, movement speed of the same was set to 500 mm/sec, the sampling rate of the detection signal Sae was set to 10 kilohertz, and a measurement period of 0.6 seconds was used.

Furthermore, as for the number M of actually extracted measurement data to be used for generating parameters, specifically, all measurement data were first sorted in ascending order, and the number of measurement data falling into a range of 65% to 90% of all data was used as the number M.

First, as shown in FIGS. 9(*a*) and 9(*b*), in a case in which lubrication was sufficient and the operational condition was normal, points respectively corresponding to each measurement data group concentrated inside the area $A_2$ shown in FIG. 2.

Next, as shown in FIG. 9(*c*), in a case in which contamination by a liquid other than the lubricant occurred, points respectively corresponding to each measurement data group concentrated inside the area $A_3$ shown in FIG. 2.

Furthermore, as shown in FIG. 10(*a*), in a case of a condition of insufficient lubrication, points respectively corresponding to each measurement data group concentrated inside the area $A_4$ shown in FIG. 2.

Lastly, as shown in FIG. 10(*b*), in a case of a condition in which a crack has occurred at any of the members inside the LM system, points respectively corresponding to each measurement data group concentrated inside the area $A_1$ shown in FIG. 2.

As seen, according to the present invention, since points respectively corresponding to each measurement data group concentrate in any one of the respective areas $A_1$ to $A_4$ shown in FIG. 2 according to the contents of the operational condition of the LM system, by executing the condition detection processing shown in FIG. 8, real-time detection of even specific contents of the operational conditions of the LM system may be performed during operation thereof without having to dismantle the LM system and while eliminating the influences of vibration attributable to operations thereof.

(III) Second Embodiment

Next, a second embodiment of the present invention, based on the above-described principle, will be specifically described with reference to FIGS. 3 to 7 and FIGS. 11 to 13.

Figure 11:
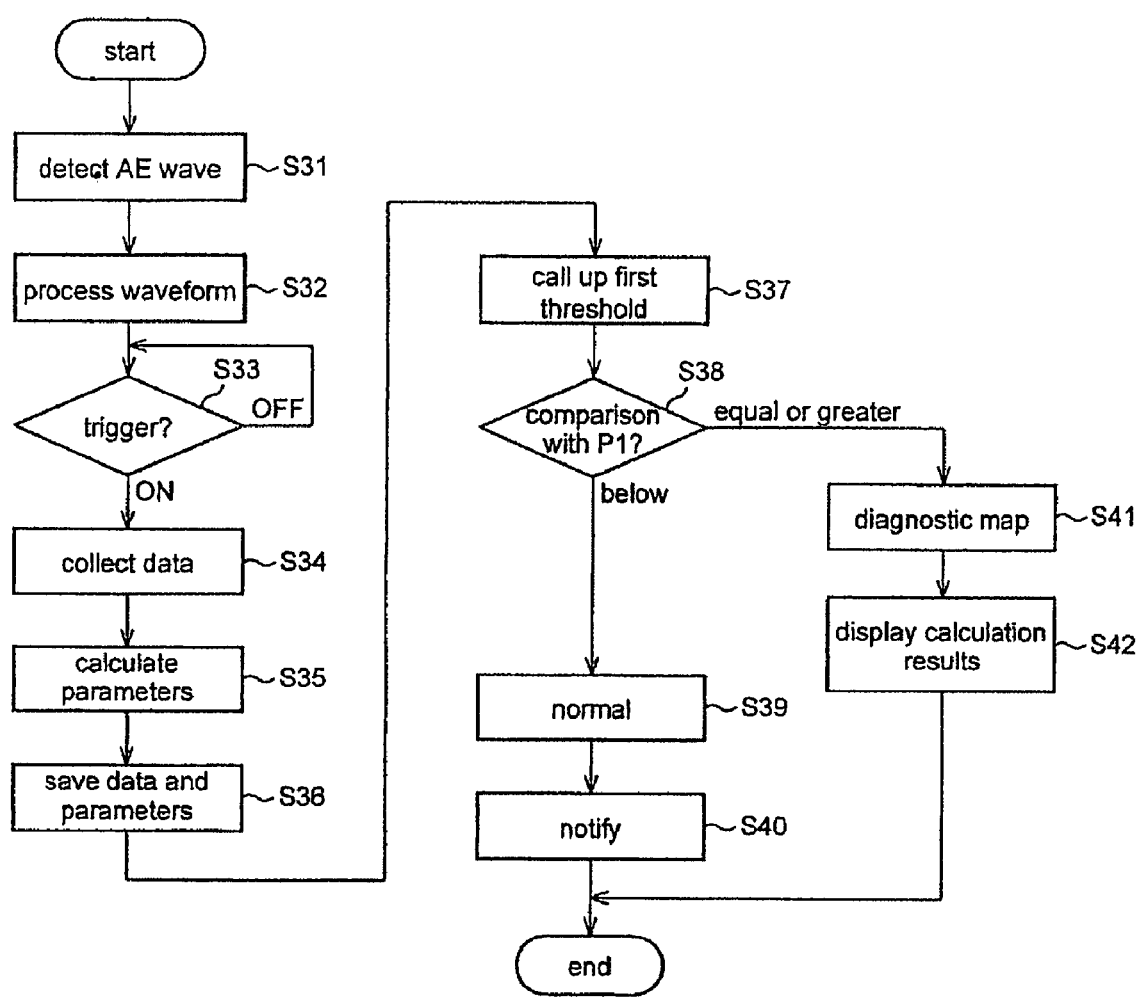
FIG. 11 is a flowchart showing operational condition detection processing according to the second embodiment.

In the drawings: FIG. 3 is a block diagram showing a general structure of a condition diagnosis apparatus according to the second embodiment; FIG. 4 is an longitudinal sectional view showing a general structure of an AE sensor that detects extended AE waves according to the second embodiment; FIGS. 5 to 7 are views for describing an LM system to which the present invention is applied; and FIG. 11 shows a flowchart representing operational condition detection processing executed by the condition diagnosis apparatus according to the second embodiment.

As shown in FIG. 3, a condition diagnosis apparatus S according to the second embodiment comprises: an AE sensor 1; a waveform shaping unit 2 including a BPF (Band Pass Filter) 2A and an envelope detection section 2B; an A/D (Analog-to-Digital) converter 3; a signal processing unit 4 that functions as a first generation device, a second generation device and a judgment device; and a display unit 5 including a liquid crystal display and the like, which functions as a display device.

Next, operations will be described.

First, the AE sensor 1 is disposed at an arbitrary position of the LM system that is an diagnostic object, such as an end position of a rail, a position on a movable block as a movable member or the like, and is further arranged so that a contact section, to be described later (FIG. 4), comes into contact with any of the above-mentioned positions. The AE sensor 1 detects extended AE waves generated by operations of the LM system, converts the detected extended AE waves into a detection signal Sae as an analog signal, and outputs the converted signal to the waveform shaping unit 2.

Next, after the detection signal Sae is amplified at an amplification section, not shown, by a required amplification factor (more specifically, i.e. around 40 decibels to 60 decibels), the BPF 2A in the waveform shaping unit 2 removes frequency components of the amplified detection signal Sae other than those of the extended AE wave, and outputs the signal Sae to the envelope detection section 2B. Herein, as a specific example of a pass frequency range at the BPF 2A with respect to the detection signal Sae, a BPF that passes frequency components that are, for instance, equal to or greater than 100 kHz and equal to or less than 1 MHz is desirably used as the BPF 2A.

The envelope detection section 2B performs envelope component processing with respect to the detection signal Sae and creates an envelope signal Sw, which is then sent to the A/D converter 3.

Next, the A/D converter 3 digitalizes the envelope signal Sw that is an analog signal and creates a digital envelope signal Sdw, which is then sent to the signal processing unit 4.

The signal processing unit 4 serves to judge the present operation (operating) condition in the LM system that is the diagnostic object by means of the operation condition detection processing shown in FIG. 11, described hereinafter, based on the digital envelope signal Sdw, and creates a judgment signal Sdp that represents a result of the judgment, which is then outputted to the display unit 5.

Accordingly, the display unit 5 displays contents of the judgment based on the judgment signal Sdp. This allows a user of the LM system to keep track of operational conditions thereof.

Next, the structure of the AE sensor 1 and modes for installing the same to the LM system as a diagnostic object will be described with reference to FIGS. 4 to 7.

An internal structure of the AE sensor 1 will be first described with reference to FIG. 4.

As shown in FIG. 4, the AE sensor 1 has a generally cylindrical shape, and more specifically, is composed of: a contact section 10 arranged so as to contact a rail LM or the like in the LM system; a chassis 11; a piezoelectric element 13; evaporated silver films 12 and 14 deposited on upper and lower surfaces of the piezoelectric element 13; and an external line 15 that conducts the above-described detection signal Sae and outputs the same to the waveform shaping unit 2.

When an extended AE wave generated inside the LM system is transmitted to the piezoelectric element 13 via the contact portion 10 and the silver thin film 14, the shape of the piezoelectric element 13 is minutely deformed by the extended AE wave. This causes an electric potential difference between the silver thin films 12 and 14, thereby generating the above-described detection signal Sae on the external line 15.

Next, modes for installing the AE sensor 1 provided with the internal structure shown in FIG. 4 to the LM system will be described with reference to FIGS. 5 to 7. FIGS. 5 and 6 are diagrams representing modes in a case in which the AE sensor 1 is installed to an LM system using a movable block as the diagnostic object LM system, while FIG. 7 is a diagram representing a mode in a case in which the AE sensor 1 is installed to an LM system using a so-called ball screw as the diagnostic object LM system.

First, the case in which the AE sensor 1 is mounted to the LM system utilizing the movable block will be described with reference to FIGS. 5 and 6.

The LM system shown in FIG. 5(a) is composed of: a rail 20 provided with ball rolling grooves 20a and 20b along which balls 22, to be described later, roll in a longitudinal direction; a movable block 21 engaged with the rail 20 via a number of balls 22 and provided therein with an endless circulation passage of the balls 22; and seal members 23 applied to both end surfaces of the movable block 21 in its direction of movement and seal the upper and both side surfaces of the rail 20, wherein the LM system is arranged so that the movable block 21 reciprocally moves on the rail 20 according to the circulation of the balls 22.

As shown in these figures, the cross-section of the rail 20 has a substantially rectangular shape, and is formed with attachment holes 24, for inserting fastening bolts, across the longitudinal direction of the rail 20 at appropriate intervals. In addition, two rows of ball rolling grooves 20a are formed on the upper surface of the rail 20 so as to sandwich the attachment holes 24 therebetween, and two rows of ball rolling grooves 20b are further formed on the respective side surfaces of the rail 20. These four rows of ball rolling grooves are formed with a curvature slightly larger than the curvature of the spherical surface of the balls 22 so as to provide a deep groove configuration.

On the other hand, the movable block 21 is composed of: a movable block main body 26 provided with a mount surface 25 to which a movable member such as table 30, to be described hereinafter, is mounted; and a pair of end plates 27 fixed to both longitudinal end surface portions of the movable block main body 26. The movable block 21 has a saddle-shaped cross section, and a lower side of the movable block 21 is provided with a depressed section into which an upper portion of the track rail 20 is loosely fitted.

More specifically, as shown in FIG. 6, the movable block main body 26 has a pair of skirt sections extending downward from a base, on which the mount surface 25 is formed, and both end portions of the base so as to provide a saddle-shaped cross section. Four rows of loaded rolling grooves 28 are formed to the inside surface of each skirt portion as well as the lower surface of the base so as to respectively oppose the ball rolling grooves 20a and 20b of the rail 20. The balls 22 roll between the loaded rolling grooves 28 and the ball rolling grooves 20a and 20b of the rail 20 while being loaded, thereby moving the movable block 21 on the rail 20.

Returning now to FIG. 5(a), the base and the respective skirt portions of the moving block main body 26 are drilled with ball return bores 29 respectively corresponding to the loaded rolling grooves 28. These ball return bores 29 are respectively coupled and communicated with the loaded rolling grooves 28 by redirection passages (not shown), having substantially U-shapes, formed on the end plates 27. In other words, the redirection passages scoop up balls 22 which have finished rolling on the loaded rolling grooves 28 of the movable block main body 26, and feed the balls 22 to the ball return bores 29. On the other hand, the redirection passages are arranged to feed out the balls 22 from the ball return bores 29 to the loaded rolling grooves 28. Accordingly, by fastening the end plates 27 to the movable block main body 26 by means of fastening bolts 27a, an endless circulation passage of the balls 22 is formed on the movable block 21.

Further, when the AE sensor 1 according to the second embodiment is installed to the LM system shown in FIG. 5(a), for instance, as shown in FIG. 5(b) as an external side view, in a case in which the table 30 is set on a plurality of movable blocks 21 that linearly move on the track rail 20, the AE sensor 1 will be placed on a position of the rail 20 that is outside the moving range of the movable block 21.

Next, a case in which the AE sensor 1 is set to the LM system utilizing the ball screw will be described with reference to FIG. 7.

As shown in FIG. 7(a), a ball screw 40 is provided with: a screw shaft 41 having an outer peripheral surface on which a spiral ball rolling groove 41a is formed; a nut member 42 having an inner peripheral surface in which a spiral loaded rolling groove 42a is formed so as to oppose the spiral ball rolling groove 41a; and balls 43 that roll between the ball rolling groove 41a and the loaded rolling groove 42a. A loaded rolling passage is formed by and between the ball rolling groove 41a of the screw shaft 41 and the loaded rolling groove 42a of the nut member 42. The nut member 42 is mounted with, for instance, two return pipes 44 as circulation members. The return pipes 44 connect one end of the loaded rolling passage to the other end thereof so as to configure a non-loaded return passage. The return pipes 44 are formed in substantially gate-shapes, and are provided with central portions 44a and a pair of leg portions 44b on both sides of the central portions 44a. The paired leg portions 44b are inserted into the loaded rolling passage at an interval of several pitches. The return pipes 44 are fixed to the nut member 42 by a coupling device such as bolts 45.

The spiral ball rolling groove 41a, having a semi-circular cross section and provided with a spiral constant lead on an outer peripheral surface thereof, is formed on the screw shaft 41 through a grinding process, rolling process or the like. The nut member 42 has substantially a cylindrical shape and is provided with a flange 46 at an end face thereof for mounting the ball screw 40 to a machine or the like. The loaded rolling groove 42a has a semi-circular sectional shape, and is formed to the inner peripheral surface of the nut member 42 so as to oppose the ball rolling groove 41a of the screw shaft 41. The nut member 42 is provided with a partial flat surface portion 47 on an upper surface thereof. A plurality of return pipe fitting holes, into which the leg portions 44b of the return pipes 44 are inserted, are formed on the flat surface portion 47.

When the AE sensor 1 according to the second embodiment is set to the LM system shown in FIG. 7(a), in a case in which a table 51 is fixed via a bracket 50 to the ball screw 51, at which the screw shaft 41 rotatably supported by, for example, a table 49, is rotated by a motor 48, the AE sensor 1 will be mounted onto a surface of the flange 46 perpendicular to the central axis of the ball screw 40.

Next, operating condition detection processing according to the second embodiment, which is primarily executed by the signal processing unit 4, will be explained with reference to FIGS. 1 to 3 and FIG. 11.

As shown in FIG. 11, in a case in which operating condition detection processing according to the second embodiment is executed during the operation of the diagnostic object LM system, processing of necessary initial settings and the like is first carried out. Next, an extended AE wave generated in accordance with an extended AE phenomenon during operations of the LM system is detected by the AE sensor 1 (step S31), processing such as waveform shaping and the like is performed on a detection signal Sae corresponding to the to the detected extended AE wave at the waveform shaping unit 2 (step S32), and an envelope signal Sw is created and outputted as a digital envelope signal Sdw via the A/D converter 3 to the signal processing unit 4.

Then, confirmation is made on whether a trigger signal corresponding to a timing preset as a timing for acquiring the above-mentioned measurement data (for instance, in the case of the LM system shown in FIG. 5, a timing at which the movable block 21 comes close to one end section of the rail 20) has been generated within the signal processing unit 4 (step S33), and the digital envelope signal Sdw is retrieved as the measurement data at the timing at which the trigger signal has been generated (step S33; ON).

Subsequently, extended AE wave detection processing (step S31), waveform shaping processing (step S32) and processing of acquisition as measurement data (step S33) are repeated over a required inspection period to accumulate measurement data as the digital envelope signal Sdw into a memory, not shown, within the signal processing unit 4 (step S34). Then, for each measurement data group, parameters $P_1$ to $P_3$, to be used for performing each judgment hereinafter described, are calculated based on each corresponding formula and based on the accumulated measurement data, and are accumulated in the above-mentioned memory (steps S35, S36).

Once calculation of each parameter $P_1$ to $P_3$ as well as accumulation thereof are completed, the signal processing unit 4 then reads out a first threshold $TH_1$ that is experimentally set in advance in correspondence to the parameter $P_1$ and stored in the memory as a criterion of judgment for judging whether the LM system according to the present embodiment is operating normally (step S37), and compares the read-out first threshold $TH_1$ with the value of the parameter $P_1$ that is stored at that time (step S38).

If the value of the parameter $P_1$ is below the first threshold $TH_1$ (step S38; below), the operational condition of the LM system at that time is judged to be normal (step S39), the normal condition is displayed using the display unit 5 (step S40), and the series of operating condition detection processing is thereby concluded.

On the other hand, if it is judged in step S38 that the value of the parameter $P_1$ is equal to or greater than the first threshold $TH_1$ (step S38; equal or greater), some kind of an abnormal operational condition is judged to have occurred in the LM system. Next, a graph (shown in FIG. 2), obtained by using a value of the parameter $P_2$ and a value of the parameter $P_3$ obtained for each single measurement data group and repeating for each of the accumulated measurement data groups a procedure in which a single measurement data group is displayed as a single plot point on a graph using values of the parameter $P_2$ as a horizontal axis and values of the parameter $P_3$ as a vertical axis, is generated within the signal processing unit 4 (step S41), and an image (hereinafter referred to as "diagnostic map") corresponding to the generated graph is displayed on the display unit 5 (step S42), thereby concluding the series of operational condition detection processing.

After the processing performed in step S42, the user studies the displayed diagnostic map, and determines in which of the areas, respectively corresponding to each of the areas $A_1$ to $A_4$ shown in FIG. 2, on the currently displayed diagnostic map are the plot points corresponding to the respective measurement data groups concentrated, in order to gain an understanding of specific contents of the present operational condition of the LM system.

As described, since extended AE waves that occur due to operations of the LM system are detected to generate the above-mentioned parameter $P_1$, and the operational condition of the LM system is judged to be normal when the value of the parameter $P_1$ is below the first threshold $TH_1$, operations of the condition diagnosis apparatus S according to the second embodiment enable real-time detection of whether the operational condition of the LM system is normal to be performed during operations thereof without having to dismantle the LM system and while eliminating the influences of vibration attributable to operations thereof.

Therefore, prognosis of occurrences of failures in the LM system may now be performed, thus improving the maneuverability for a user of the LM system and elongating the usable life time thereof and improving the quality of devices or machineries manufactured by utilizing this LM system.

In addition, since a diagnostic map, which is obtained by using a value of the parameter $P_2$ and a value of the parameter $P_3$ obtained for a single measurement data group and repeating for each measurement data group a procedure in which a single measurement data group is displayed as a single plot point on a graph corresponding to FIG. 2, is displayed on the display unit 5, a user of the LM system may be made aware of the present operational condition of the LM system.

Therefore, prognosis of occurrences of failures in the LM system may now be performed using the diagnostic map, thus improving the maneuverability for a user of the LM system and elongating the usable life time thereof and improving the quality of devices or machineries manufactured by utilizing this LM system.

Furthermore, since the parameter $P_2$ is a parameter given by $$P_2 = \frac{1}{\sqrt{\frac{1}{N}\sum_{i=1}^{N}(K - X_i)^2}} \qquad \text{[Formula 39]}$$

and the parameter $P_3$ is a parameter given by $$P_3 = \frac{\sqrt{\frac{1}{M}\sum_{j=1}^{M}(X_j)^2}}{P_1}, \qquad \text{[Formula 40]}$$

detection of specific contents of operational conditions may be performed more precisely.

Incidentally, by recording a program corresponding to the flowchart shown in FIG. 11 to an information recording medium such as flexible disk or a hard disk and the like, or otherwise recording a program obtained via a network such as the Internet or the like, and reading out and subsequently executing the program by a general-purpose micro-computer, such a micro-computer may be enabled to function as the signal processing unit 4 according to the second embodiment. In this case, the above-described AE sensor 1, the waveform shaping unit 2 and the A/D converter 3 will be configured as an external apparatus to the micro-computer.

Additionally, regarding the respective parameters $P_1$ to $P_3$, for instance, values represented by $$P_1 = \frac{1}{N}\sum_{i=1}^{N} X_i \text{ (arithmetic average)} \qquad \text{[Formula 41]}$$

or $$P_3 = \frac{\sqrt{\frac{1}{N}\sum_{i=1}^{N}(X_i)^2}}{\frac{1}{N}\sum_{i=1}^{N} X_i} \qquad \text{[Formula 42]}$$

may be respectively used in addition to the values described above.

Furthermore, the parameter $P_1$ may be any statistic that indicates the measure of extended AE waves.

Moreover, the parameter $P_2$ may be any parameter as long as such a parameter performs weighting on components of an extended AE wave that are temporally-continuously detected, and changes in correspondence to changes in such components.

In addition, the parameter $P_3$ may be any parameter as long as such a parameter performs weighting on components of an extended AE wave that are temporally-discontinuously detected in correspondence to the movement of the balls B, and changes in correspondence to changes in such components. Here, in contrast to the parameter $P_2$ that performs weighting on components which are "temporally-continuously" detected, the definition of the term "temporally-discontinuous" that is used in relation to the parameter $P_3$ includes other cases that are temporally-discontinuous or, in other words, cases in which, for instance, extended AE waves are intermittently detected at a certain cycle, and cases in which extended AE waves are randomly detected without any periodicity or the like.

As described above, in a case in which the parameter $P_2$ is defined as a parameter that changes in correspondence to changes in components of an extended AE wave that are temporally-continuously detected, and the parameter $P_3$ is further defined as a parameter that changes in correspondence to changes in components that are temporally-discontinuously detected primarily in correspondence with the movement of the balls B, a configuration is possible in which a lowpass filter, having a cutoff frequency that is lower than the detected frequency of components that are temporally-discontinuously detected in correspondence with the movement of the balls B, is used to extract components that are temporally-continuously detected, and a highpass filter having the same cutoff frequency is further used to extract components that are temporally-discontinuously detected. In this case, a condition diagnosis apparatus similar to the condition diagnosis apparatus S according to the second embodiment may be achieved with a simpler configuration without having to use a circuit for envelope detection shown in FIG. 3.

Furthermore, in the above-mentioned second embodiment, the condition detection apparatus S shown in FIG. 3 is configured as a single apparatus. More specifically, the second embodiment is applied to a case in which the condition diagnosis apparatus S is carried to a factory or the like, at which a diagnostic object LM system is installed and used, to perform on-site detection and diagnostics of the operational condition of the LM system.

Moreover, in addition to the above-described mode, the condition detection apparatus S according to the second embodiment may be applied to a case in which the condition diagnosis apparatus S is permanently placed at a factory or the like at which a diagnostic object LM system is installed and used, and detection and diagnostics of the operational condition of the LM system is performed by a diagnostic personnel from an isolated location by remotely controlling the condition diagnosing apparatus S via a telephone line or the like.

Additionally, the present invention may be applied to a case in which: the condition diagnosis apparatus S is permanently placed at a factory or the like at which a diagnostic object LM system is installed and used; detection and diagnostics of the operational condition of the LM system is automatically performed by the condition diagnosis apparatus S while concurrently transferring the detection results to another location to be accumulated; and accumulative fault diagnostics is performed based on the accumulated detection results.

Furthermore, in the above-described second embodiment, although a description has been provided on configuring the condition detection apparatus S so that one waveform shaping unit 2, one A/D converter 3, one signal processing unit 4 and one display unit 5 are respectively utilized for one AE sensor 1, the condition detection apparatus S may be alternatively configured so that the detection signals Sae from a plurality of AE sensors 1 are inputted via a switching circuit into one waveform shaping unit 2 and the detection signals Sae from a plurality of AE sensors 1 are processed by respectively utilizing one waveform shaping unit 2, one A/D converter 3, one signal processing unit 4 and one display unit 5. In this case, it will be necessary to synchronize the execution timing of the detection processing utilizing the waveform shaping unit 2, the A/D converter 3, the signal processing unit 4 and the display unit 5 with the retrieval timing of the detection signal Sae from the corresponding AE sensor 1.

SECOND EXAMPLE

Next, in order to demonstrate the effectiveness of the above-described principle of the present invention as well as the condition detection apparatus S according to the second embodiment, a display example of a diagnostic map on which a group of actual measurement data is plotted using the graph shown in FIG. 2 will be described with reference to FIGS. 12 and 13.

As for the experimental environment in which the respective plot points indicated below were obtained, in the case of FIG. 12, a model SNS55LR manufactured by the present applicant was used as an LM guide to which the AE sensor 1 is set. External load to the movable block was set to 0.09 C (14.7 kN), the stroke or movement distance of the movable block was set to 250 mm, movement speed of the same was set to 400 mm/sec, the sampling rate of the detection signal Sae was set to 10 kilohertz, and a measurement period of 0.4 seconds was used.

Additionally, in the case of FIG. 13, a model SHS25V manufactured by the present applicant was used as an LM guide to which the AE sensor 1 is set. External load to the movable block was set to 0.7 C (22.2 kN), the stroke or movement distance of the movable block was set to 350 mm, movement speed of the same was set to 500 mm/sec, the sampling rate of the detection signal Sae was set to 10 kilohertz, and a measurement period of 0.6 seconds was used.

Furthermore, as for the number M of actually extracted measurement data to be used for generating parameters, specifically, all measurement data were first sorted in ascending order, and the number of measurement data falling into a range of 65% to 90% of all data was used as the number M.

First, as shown in FIGS. 12(*a*) and 12(*b*), in a case in which lubrication was sufficient and the operational condition was normal, plot points respectively corresponding to each measurement data group will be displayed on the diagnostic map M on the display unit 5 in a state in which the plot points are concentrated at a position corresponding to the position of the area $A_2$ shown in FIG. 2.

Next, as shown in FIG. 12(*c*), in a case in which contamination by a liquid other than the lubricant has occurred, plot points respectively corresponding to each measurement data group will be displayed on the diagnostic map M on the display unit 5 in a state in which the plot points are concentrated at a position corresponding to the position of the area $A_3$ shown in FIG. 2.

Furthermore, as shown in FIG. 13(*a*), in a case of a condition of insufficient lubrication, plot points respectively corresponding to each measurement data group will be displayed on the diagnostic map M on the display unit 5 in a state in which the plot points are concentrated at a position corresponding to the position of the area $A_4$ shown in FIG. 2.

Lastly, as shown in FIG. 13(*b*), in a case in which a crack has occurred at any of the members in the LM system, plot points respectively corresponding to each measurement data group will be displayed on the diagnostic map M on the display unit 5 in a state in which the plot points are concentrated at a position corresponding to the position of the area $A_1$ shown in FIG. 2.

As seen, according to the present invention, since plot points respectively corresponding to each measurement data group will be displayed on the diagnostic map M on the display unit 5 in a state in which the plot points are concentrated at positions corresponding to any one of the respective areas $A_1$ to $A_4$ shown in FIG. 2 according to the contents of the operational condition of the LM system, by executing the condition detection processing shown in FIG. 11, real-time detection of even specific, contents of the operational conditions of the LM system may be performed during operation thereof without having to dismantle the LM system and while eliminating the influences of vibration attributable to operations thereof.

INDUSTRIAL APPLICABILITY

As described above, the present invention may be utilized in a field of judgment of operational conditions of a LM system, and in particular, significant advantages may be achieved by applying the present invention to a field of judgment of operational conditions of a linear motion system such as an LM guide or a ball spline and the like.

The invention claimed is:

1. A condition detection apparatus that detects a current operational condition of a linear rolling motion guide apparatus, the condition detection apparatus characterized by comprising:
   a detection device that detects elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at at least either one of the rolling members or the rolling surface, occurring when a plurality of rolling members included in the linear rolling motion guide apparatus self-rotate and revolve at the same time, and generates an electric detection signal corresponding to a detected undulation;
   a first generation device that generates a first parameter indicating an intensity of the undulation based on the generated detection signal; and
   a judgment device that judges the operational condition to be normal when the generated value of the first parameter is below a first threshold that is preset for the first parameter.

2. The condition detection apparatus according to claim 1, characterized by further comprising:
   a second generation device that weights only detection signals temporally-continuously detected among the generated detection signals, based on the detection signals, to generate a second parameter; and
   a third generation device that weights only detection signals temporally-discontinuously detected in correspondence with the movement of the rolling members among the generated detection signals, based on the detection signals, to generate a third parameter, wherein
   the judgment device is arranged to perform judgment on the above-described contents using at least either the second parameter or the third parameter when the generated value of the first parameter is equal to or greater than the first threshold.

3. The condition detection apparatus according to claim 2, characterized in that:
   if $X_i$ is a measurement obtained by sampling the detection signals and N is a total number of such measurements, then the first parameter $P_1$ is a parameter which may be expressed as $$P_1 = \sqrt{\frac{1}{N}\sum_{i=1}^{N}(X_i)^2}\,;\qquad\text{[Formula 1]}$$

if a constant K (volts) is a maximum input range at the detection device, then the second parameter $P_2$ is a parameter which may be expressed as $$P_2 = \frac{1}{\sqrt{\frac{1}{N}\sum_{i=1}^{N}(K-X_i)^2}}\,;\text{ and}\qquad\text{[Formula 2]}$$

if M is a number of extractions used as the measurement, then the third parameter $P_3$ is a parameter which may be expressed as $$P_3 = \frac{\sqrt{\frac{1}{M}\sum_{j=1}^{M}(X_j)^2}}{P_1}.\qquad\text{[Formula 3]}$$

4. The condition detection apparatus according to claim 2 or 3, characterized in that
the judgment device judges that the operational condition is a condition of insufficient lubrication in the event that the generated value of the first parameter is equal to or greater than the first threshold, the generated value of the second parameter is equal to or greater than a second threshold that is preset for the second parameter, and the generated value of the third parameter is below a third threshold that is preset for the third parameter.

5. The condition detection apparatus according to claim 2 or 3, characterized in that
the judgment device judges that the operational condition is a condition in which the circulation section is contaminated by a liquid other than the lubricant in the event that the generated value of the first parameter is equal to or greater than the first threshold, the generated value of the second parameter is equal to or greater than the second threshold that is preset for the second parameter, and the generated value of the third parameter is equal to or greater than the third threshold that is preset for the third parameter.

6. The condition detection apparatus according to claim 2 or 3, characterized in that
the judgment device judges that the operational condition is a condition in which a crack has occurred at at least either one of the rolling members or the rolling surface in the event that the generated value of the first parameter is equal to or greater than the first threshold, the generated value of the second parameter is below the second threshold that is preset for the second parameter, and the generated value of the third parameter is equal to or greater than the third threshold that is preset for the third parameter.

7. The condition detection apparatus according to claim 1, characterized by further comprising
a notification device that notifies any of the operational conditions judged by the judgment device.

8. A condition detection method for detecting a current operational condition of a linear rolling motion guide apparatus, the condition detecting method characterized by comprising:
a detection step for detecting elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at at least either one of the rolling members or the rolling surface, occurring when a plurality of rolling members included in the linear rolling motion guide apparatus self-rotate and revolve at the same time, and generating an electric detection signal corresponding to a detected undulation;
a first generation step for generating a first parameter indicating an intensity of the undulation based on the generated detection signal; and
a judgment step for judging the operational condition to be normal when the generated value of the first parameter is below a first threshold that is preset for the first parameter.

9. The condition detection method according to claim 8, characterized by further comprising:
a second generation step for weighting only detection signals temporally-continuously detected among the generated detection signals, based on the detection signals, to generate a second parameter; and
a third generation step for weighting only detection signals temporally-discontinuously detected in correspondence to the movement of the rolling members among the generated detection signals, based on the detection signals, to generate a third parameter, wherein
judgment is performed on the above-described contents in the judgment step using at least either the second parameter or the third parameter when the generated value of the first parameter is equal to or greater than the first threshold.

10. The condition detection method according to claim 9, characterized in that:
if $X_i$, is a measurement obtained by sampling the detection signals and N is a total number of such measurements, then the first parameter $P_1$ is a parameter which may be expressed as $$P_1 = \sqrt{\frac{1}{N}\sum_{i=1}^{N}(X_i)^2}\,;\qquad\text{[Formula 4]}$$

if a constant K (volts) is a maximum input range at the detection device, then the second parameter $P_2$ is a parameter which may be expressed as $$P_2 = \frac{1}{\sqrt{\frac{1}{N}\sum_{i=1}^{N}(K-X_i)^2}}\,;\text{ and}\qquad\text{[Formula 5]}$$

if M is a number of extractions used as the measurement, then the third parameter $P_3$ is a parameter which may be expressed as $$P_3 = \frac{\sqrt{\frac{1}{M}\sum_{j=1}^{M}(X_j)^2}}{P_1}.$$

[Formula 6]

11. The condition detection method according to claim 9 or 10, characterized in that
the operational condition is judged in the judgment step to be a condition of insufficient lubrication in the event that the generated value of the first parameter is equal to or greater than the first threshold, the generated value of the second parameter is equal to or greater than a second threshold that is preset for the second parameter, and the generated value of the third parameter is below a third threshold that is preset for the third parameter.

12. The condition detection method according to claim 9 or 10, characterized in that
the operational condition is judged in the judgment step to be a condition in which the circulation section is contaminated by a liquid other than the lubricant in the event that the generated value of the first parameter is equal to or greater than the first threshold, the generated value of the second parameter is equal to or greater than the second threshold that is preset for the second parameter, and the generated value of the third parameter is equal to or greater than the third threshold that is preset for the third parameter.

13. The condition detection method according to claim 9 or 10, characterized in that
the operational condition is judged in the judgment step to be a condition in which a crack has occurred at at least either one of the rolling members or the rolling surface in the event that the generated value of the first parameter is equal to or greater than the first threshold, the generated value of the second parameter is below the second threshold that is preset for the second parameter, and the generated value of the third parameter is equal to or greater than the third threshold that is preset for the third parameter.

14. The condition detection method according to claim 8, characterized by further comprising
a notification step for notifying any of the operational conditions judged in the judgment step.

15. A condition detection program characterized in that the program enables a computer included in a condition detection apparatus that detects a current operational condition of a linear rolling motion guide apparatus to function as:
a detection device that detects elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at at least either one of the rolling members or the rolling surface, occurring when a plurality of rolling members included in the linear rolling motion guide apparatus self-rotate and revolve at the same time, and generates an electric detection signal corresponding to a detected undulation;
a first generation device that generates a first parameter indicating an intensity of the undulation based on the generated detection signal;
a second generation device that weights only detection signals temporally-continuously detected among the generated detection signals, based on the detection signals, to generate a second parameter;
a third generation device that weights only detection signals temporally-discontinuously detected in correspondence to movement of the rolling members among the generated detection signals, based on the detection signals, to generate a third parameter; and
a judgment device that judges contents of the operational condition using at least any one of the first parameter, the second parameter or the third parameter.

16. An information recording medium, characterized in that the condition detection program according to claim 15 is recorded thereon so as to be readable by the computer.

17. A condition display apparatus characterized in that the apparatus displays a current operational condition of a linear rolling motion guide apparatus, the condition display apparatus comprising:
a detection device that detects elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at at least either one of the rolling members or the rolling surface, occurring when a plurality of rolling members included in the linear rolling motion guide apparatus self-rotate and revolve at the same time, and generates an electric detection signal corresponding to a detected undulation;
a sampling device that samples the generated detection signals and generates detection data;
a first generation device that respectively generates, based on respective detection data contained in detection data groups composed of a plurality of detection data obtained during a preset detection period, a first parameter obtained by performing weighting on only detection data corresponding to detection signals that have been temporally-continuously detected among the generated detection signals, for each of a plurality of detection data groups corresponding to different detection periods;
a second generation device that respectively generates, based on respective detection data contained in the detection data groups, a second parameter obtained by performing weighting on only detection data corresponding to detection signals that have been temporally-discontinuously detected in correspondence to movement of the rolling members among the generated detection signals, for each of the plurality of detection data groups corresponding to the different detection periods; and
a display control device that displays a graph, obtained by using a value of the first parameter and a value of the second parameter obtained for each single detection data group and repeating for each detected data group a procedure in which the single detection data group is displayed as a single plot point on a graph using values of the first parameter as a first axis and values of the second parameter as a second axis, onto a display device.

18. The condition display apparatus according to claim 17, characterized in that:
if $X_i$, is a value of each detection data, N is a total number of detection data contained in the corresponding detection data group, and a constant K (volts) is a maximum input range at the detection device, then the first parameter $P_2$ is a parameter which may be expressed as $$P_2 = \frac{1}{\sqrt{\frac{1}{N}\sum_{i=1}^{N}(K-X_i)^2}}; \text{ and} \qquad \text{[Formula 7]}$$

if M is a number of extractions used as the detection data, then the second parameter $P_3$ is a parameter which may be expressed as $$P_3 = \frac{\sqrt{\frac{1}{M}\sum_{j=1}^{M}(X_j)^2}}{P_1}. \qquad \text{[Formula 8]}$$

19. A condition display method for displaying a current operational condition of a linear rolling motion guide apparatus, the condition display method characterized by comprising:

a detection step for detecting elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at at least either one of the rolling members or the rolling surface, occurring when a plurality of rolling members included in the linear rolling motion guide apparatus self-rotate and revolve at the same time, and generating an electric detection signal corresponding to a detected undulation;

a sampling step for sampling the generated detection signals and generating detection data;

a first generation step for respectively generating, based on respective detection data contained in detection data groups composed of a plurality of detection data obtained during a preset detection period, a first parameter obtained by performing weighting on only detection data corresponding to detection signals that have been temporally-continuously detected among the generated detection signals, for each of a plurality of detection data groups corresponding to different detection periods;

a second generation step for respectively generating, based on respective detection data contained in the detection data groups, a second parameter obtained by performing weighting on only detection data corresponding to detection signals that have been temporally-discontinuously detected in correspondence to movement of the rolling members among the generated detection signals, for each of the plurality of detection data groups corresponding to the different detection periods; and a display control step for displaying a graph, obtained by using a value of the first parameter and a value of the second parameter obtained for each single detection data group and repeating for each detected data group a procedure in which the single detection data group is displayed as a single plot point on a graph using values of the first parameter as a first axis and values of the second parameter as a second axis, onto a display device.

20. The condition display method according to claim 19, characterized in that:

if $X_i$, is a value of each detection data, N is a total number of detection data contained in the corresponding detection data group, and a constant K (volts) is a maximum input range at the detection device, then the first parameter $P_2$ is a parameter which may be expressed as $$P_2 = \frac{1}{\sqrt{\frac{1}{N}\sum_{i=1}^{N}(K-X_i)^2}}; \text{ and} \qquad \text{[Formula 9]}$$

if M is a number of extractions used as the detection data, then the second parameter $P_3$ is a parameter which may be expressed as $$P_3 = \frac{\sqrt{\frac{1}{M}\sum_{j=1}^{M}(X_j)^2}}{P_1}. \qquad \text{[Formula 10]}$$

21. A computer readable medium characterized in that:

the computer readable medium contains a program which when executed by a computer enables the computer included in a condition display apparatus to display a current operational condition of a linear rolling motion guide apparatus and to function as:

a detection device that detects elastically-occurring undulations which are attributable to at least any one of collisions between the rolling members and a rolling surface included in the linear rolling motion guide apparatus, slippages at a contact section of the rolling surface and the rolling members, collisions between rolling members or slippages between rolling members at a contact section, or a crack occurring at at least either one of the rolling members or the rolling surface, occurring when a plurality of rolling members included in the linear rolling motion guide apparatus self-rotate and revolve at the same time, and generates an electric detection signal corresponding to a detected undulation;

a sampling device that samples the generated detection signals and generates detection data;

a first generation device that respectively generates, based on respective detection data contained in detection data groups composed of a plurality of detection data obtained during a preset detection period, a first parameter obtained by performing weighting on only detection data corresponding to detection signals that have been temporally-continuously detected among the generated detection signals, for each of a plurality of detection data groups corresponding to different detection periods;

a second generation device that respectively generates, based on respective detection data contained in the detection data groups, a second parameter obtained by performing weighting on only detection data corresponding to detection signals that have been temporally-discontinuously detected in correspondence to movement of the rolling members among the generated detection signals, for each of the plurality of detection data groups corresponding to the different detection periods; and a display control device that displays a graph, obtained by using a value of the first parameter and a value of the second parameter obtained for each single detection data group and repeating for each detected data group a procedure in which the single detection data group is displayed as a single plot point on a graph using values of the first parameter as a first axis and values of the second parameter as a second axis, onto a display device.

* * * * *